(12) United States Patent
Siminoff

(10) Patent No.: US 10,885,396 B2
(45) Date of Patent: Jan. 5, 2021

(54) GENERATING COMPOSITE IMAGES USING AUDIO/VIDEO RECORDING AND COMMUNICATION DEVICES

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 15/984,298

(22) Filed: May 18, 2018

(65) Prior Publication Data

US 2018/0341835 A1    Nov. 29, 2018

Related U.S. Application Data

(60) Provisional application No. 62/510,271, filed on May 24, 2017.

(51) Int. Cl.
*G06K 9/62* (2006.01)
*G06K 9/00* (2006.01)
(Continued)

(52) U.S. Cl.
CPC ......... *G06K 9/6289* (2013.01); *G06F 16/434* (2019.01); *G06F 16/5838* (2019.01);
(Continued)

(58) Field of Classification Search
CPC ............. G06K 9/6289; G06K 9/00255; G06K 9/00268; G06K 9/6202; G06F 16/5838; G06F 16/434; G08B 13/196; G08B 13/19608; H04N 5/247; H04N 7/186; G06T 7/70; G06T 7/20; G06T 2207/20221; G06T 2207/30201; G06T 2207/30232

See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 Y | 11/2003 |
| CN | 2792061 Y | 6/2006 |

(Continued)

*Primary Examiner* — Leon Flores
(74) *Attorney, Agent, or Firm* — Greenberg Traurig, LLP

(57) ABSTRACT

Some embodiments provide methods for providing images of a person generated by two or more A/V recording and communication devices to one or more users, via a user's client device. For example, first image data may be received from a first A/V recording and communication device at a first location and second image data may be received from a second A/V recording and communication device at a second location. The first image data and the second image data may be analyzed to determine a person depicted in the first image data and a person depicted in the second image data is the same person. In response, a user alert may be generated including data representative of a first facial image of the person and a second facial image of the person. The user alert may then be transmitted to a user's client device.

20 Claims, 19 Drawing Sheets

(51) Int. Cl.
*H04N 5/247* (2006.01)
*G08B 13/196* (2006.01)
*G06F 16/432* (2019.01)
*G06F 16/583* (2019.01)
*H04N 7/18* (2006.01)
*G06Q 50/26* (2012.01)
*G06T 7/20* (2017.01)
*G06T 7/70* (2017.01)

(52) U.S. Cl.
CPC ..... *G06K 9/00255* (2013.01); *G06K 9/00268* (2013.01); *G06K 9/00288* (2013.01); *G06K 9/6202* (2013.01); *G08B 13/196* (2013.01); *G08B 13/19608* (2013.01); *H04N 5/247* (2013.01); *H04N 7/186* (2013.01); *G06Q 50/265* (2013.01); *G06T 7/20* (2013.01); *G06T 7/70* (2017.01); *G06T 2207/20221* (2013.01); *G06T 2207/30201* (2013.01); *G06T 2207/30232* (2013.01)

(56) References Cited

U.S. PATENT DOCUMENTS

| | | | |
|---|---|---|---|
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |
| 6,456,322 | B1 | 9/2002 | Marinacci |
| 6,476,858 | B1 | 11/2002 | Ramirez Diaz et al. |
| 6,633,231 | B1 | 10/2003 | Okamoto et al. |
| 6,658,091 | B1 | 12/2003 | Naidoo et al. |
| 6,753,774 | B2 | 6/2004 | Pan et al. |
| 6,970,183 | B1 | 11/2005 | Monroe |
| 7,062,291 | B2 | 6/2006 | Ryley et al. |
| 7,065,196 | B2 | 6/2006 | Lee |
| 7,085,361 | B2 | 8/2006 | Thomas |
| 7,109,860 | B2 | 9/2006 | Wang |
| 7,193,644 | B2 | 3/2007 | Carter |
| 7,304,572 | B2 | 12/2007 | Sheynman et al. |
| 7,382,249 | B2 | 6/2008 | Fancella |
| 7,450,638 | B2 | 11/2008 | Iwamura |
| 7,643,056 | B2 | 1/2010 | Silsby |
| 7,683,924 | B2 | 3/2010 | Oh et al. |
| 7,683,929 | B2 | 3/2010 | Elazar et al. |
| 7,738,917 | B2 | 6/2010 | Ryley et al. |
| 8,139,098 | B2 | 3/2012 | Carter |
| 8,144,183 | B2 | 3/2012 | Carter |
| 8,154,581 | B2 | 4/2012 | Carter |
| 8,619,136 | B2 | 12/2013 | Howarter et al. |
| 8,872,915 | B1 | 5/2014 | Scalisi et al. |
| 8,780,201 | B1 | 7/2014 | Scalisi et al. |
| 8,823,795 | B1 | 9/2014 | Scalisi et al. |
| 8,842,180 | B1 | 9/2014 | Kasmir et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,058,738 | B1 | 6/2015 | Scalisi |
| 9,060,103 | B2 | 6/2015 | Scalisi |
| 9,060,104 | A1 | 6/2015 | Scalisi |
| 9,065,987 | B2 | 6/2015 | Scalisi |
| 9,094,584 | B2 | 7/2015 | Scalisi et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Kasmir et al. |
| 9,165,444 | B2 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi |
| 9,179,108 | B1 | 11/2015 | Scalisi |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,230,424 | B1 * | 1/2016 | Scalisi ............... G08B 27/005 |
| 9,237,318 | B2 | 1/2016 | Kasmir et al. |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,508,239 | B1 | 11/2016 | Harrison et al. |
| 9,736,284 | B2 | 8/2017 | Scalisi et al. |
| 9,743,049 | B2 | 8/2017 | Scalisi et al. |
| 9,769,435 | B2 | 9/2017 | Scalisi et al. |
| 9,786,133 | B2 | 10/2017 | Harrison et al. |
| 9,799,183 | B2 | 10/2017 | Harrison et al. |
| 2002/0094111 | A1 | 7/2002 | Puchek et al. |
| 2002/0147982 | A1 | 10/2002 | Naidoo et al. |
| 2003/0043047 | A1 | 3/2003 | Braun |
| 2004/0085205 | A1 | 5/2004 | Yeh |
| 2004/0085450 | A1 | 5/2004 | Stuart |
| 2004/0086093 | A1 | 5/2004 | Schranz |
| 2004/0095254 | A1 | 5/2004 | Maruszczak |
| 2004/0135686 | A1 | 7/2004 | Parker |
| 2005/0111660 | A1 | 5/2005 | Hosoda |
| 2006/0010199 | A1 | 1/2006 | Brailean et al. |
| 2006/0022816 | A1 | 2/2006 | Yukawa |
| 2006/0139449 | A1 | 6/2006 | Cheng et al. |
| 2006/0156361 | A1 | 7/2006 | Wang et al. |
| 2007/0008081 | A1 | 1/2007 | Tylicki et al. |
| 2010/0225455 | A1 | 9/2010 | Claiborne et al. |
| 2013/0057695 | A1 | 3/2013 | Huisking |
| 2014/0267716 | A1 | 9/2014 | Child et al. |
| 2015/0163463 | A1 | 6/2015 | Hwang et al. |
| 2017/0134698 | A1 * | 5/2017 | Mahar ............... G08B 13/19697 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

GENERATING COMPOSITE IMAGES USING AUDIO/VIDEO RECORDING AND COMMUNICATION DEVICES

CROSS-REFERENCE TO RELATED APPLICATION

This application claims priority to provisional application Ser. No. 62/510,271, filed on May 24, 2017, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell at the entrance to the home, acts as a powerful deterrent against would-be burglars.

SUMMARY

The various embodiments of the present generating composite facial images using audio/video recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that audio/video (A/V) recording and communication devices (e.g., doorbells) other than the present embodiments sometimes capture only partial facial images of persons in the field of view of the camera. Partial facial images sometimes do not provide enough information to allow for a positive identification of the person in the video or still image. The present embodiments solve this problem by leveraging the functionality of A/V recording and communication devices, such as A/V recording and communication doorbells, to generate composite facial images based on partial facial image(s) captured by multiple cameras. These composite facial images provide a more easily identifiable picture of the person(s) in the field of view of the camera, which facilitates positive identification of criminal perpetrators, thereby enhancing public safety by making it easier for such perpetrators to be apprehended and convicted.

In particular, sometimes the cameras of two or more A/V recording and communication devices each capture partial facial images (e.g., from different angles and/or vantage points) of the same person. The partial facial images can be of limited value in identifying the person(s) in the images, due to the lack of a complete picture of the person's face in any one image. It would be advantageous, then, if partial facial images could be combined to form a composite image that shows the entire face (or at least a more complete face) of a person captured in multiple images. But A/V recording and communication devices other than the present embodiments do not provide the ability to identify image data including partial facial images from two or more cameras, or to determine that the partial facial images are of the same person. The present embodiments solve this problem by enabling image data from multiple A/V recording and communication devices to be analyzed so that partial facial images of a same person can be identified. The partial facial images of the same person are then combined in the present embodiments to generate a composite facial image of a complete face of the person (or at least a more complete face than any of the partial images alone). With a composite facial image, the identity of the person in the partial facial images can be more effectively determined, thereby enabling users to make more educated decisions of whether the person is suspicious or dangerous, and also whether or not to notify law enforcement, family members, neighbors, or the like. The composite facial image can also make it easier for law enforcement to identify, apprehend, and convict the criminal perpetrator (in instances where the person in the composite facial image has committed one or more criminal acts).

In some embodiments, the combined partial facial images may be obtained from two or more A/V recording and communication devices that are located at different properties/addresses and/or associated with different client devices (e.g., different users). In other embodiments, the combined partial facial images may be obtained from two or more A/V recording and communication devices that are located at a same property/address and/or associated with a same client device (e.g., a single user). In still further embodiments, the combined partial facial images may be obtained from a single A/V recording and communication device that captures images of the person from multiple angles.

In a first aspect, a method for generating a composite facial image of a face of a person using first image data from a first audio/video (A/V) recording and communication device having a first camera and second image data from a second A/V recording and communication device having a second camera is provided, the method comprising receiving the first image data from the first camera and the second image data from the second camera, analyzing the first image data and the second image data, based on the analyzing, determining that the first image data includes a first partial facial image of the person and the second image data includes a second partial facial image of the person, wherein the first partial facial image includes a first portion of the face of the person and the second partial facial image does not include the first portion of the face of the person, generating the composite facial image of the person based, at least in part, on the first partial facial image and the second partial facial image, and generating and transmitting, to a client device, a user alert including the composite facial image.

In an embodiment of the first aspect, the user alert includes streaming video footage recorded by at least one of the first camera of the first A/V recording and communication device and the second camera of the second A/V recording and communication device.

In another embodiment of the first aspect, the first and second A/V recording and communication devices are associated with a same user.

In another embodiment of the first aspect, the first and second A/V recording and communication devices are installed at a same address.

In another embodiment of the first aspect, the method is performed by a hub device in network communication with the first and second A/V recording and communication devices.

In another embodiment of the first aspect, the method is performed by the first A/V recording and communication device.

In another embodiment of the first aspect, the first and second A/V recording and communication devices are associated with different users.

In another embodiment of the first aspect, the first and second A/V recording and communication devices are installed at different addresses.

In another embodiment of the first aspect, the composite facial image is a three-dimensional projection of a head of the person.

In another embodiment of the first aspect, the composite facial image is programmed to be rotatable by a user of the client device.

Another embodiment of the first aspect further comprises comparing the composite facial image to a database of suspicious persons, based on the comparing, determining that the person is a suspicious person, based on the determining that the person is a suspicious person, retrieving information about the person from the database, and transmitting the retrieved information with the user alert including the composite facial image.

Another embodiment of the first aspect further comprises transmitting a request to the client device to determine if the person is authorized based on the composite facial image, and in response to the transmitting, receiving a response to the request, wherein if the person is authorized, adding the person to a database of authorized persons, and if the person is not authorized, adding the person to a database of suspicious persons.

In another embodiment of the first aspect, analyzing the first image data and the second image data comprises identifying first facial features from the first image data and second facial features from the second image data, and comparing the first facial features and the second facial features.

In a second aspect, a method for generating a composite facial image of a face of a person using first image data from a first audio/video (A/V) recording and communication device having a first camera and second image data from a second A/V recording and communication device having a second camera is provided, the method comprising receiving the first image data from the first camera and the second image data from the second camera, the first image data including a first partial facial image and the second image data including a second partial facial image, analyzing the first partial facial image and the second partial facial image, based on the analyzing, determining that the first partial facial image includes a first portion of the face of the person and the second partial facial image includes a second portion of the face of the person different from the first portion, generating the composite facial image of the face of the person based, at least in part, on the first partial facial image and the second partial facial image, and generating and transmitting, to a client device, a user alert including the composite facial image.

In an embodiment of the second aspect, the user alert includes streaming video footage recorded by at least one of the first camera of the first A/V recording and communication device and the second camera of the second A/V recording and communication device.

In another embodiment of the second aspect, the first and second A/V recording and communication devices are associated with a same user.

In another embodiment of the second aspect, the first and second A/V recording and communication devices are installed at a same address.

In another embodiment of the second aspect, the method is performed by a hub device in network communication with the first and second A/V recording and communication devices.

In another embodiment of the second aspect, the method is performed by the first A/V recording and communication device.

In another embodiment of the second aspect, the first and second A/V recording and communication devices are associated with different users.

In another embodiment of the second aspect, the first and second A/V recording and communication devices are installed at different addresses.

In another embodiment of the second aspect, the composite facial image is a three-dimensional projection of a head of the person.

In another embodiment of the second aspect, the composite facial image is programmed to be rotatable by a user of the client device.

Another embodiment of the second aspect further comprises comparing the composite facial image to a database of suspicious persons, based on the comparing, determining that the person is a suspicious person, based on the determining that the person is a suspicious person, retrieving information about the person from the database, and transmitting the retrieved information with the user alert including the composite facial image.

Another embodiment of the second aspect further comprises transmitting a request to the client device to determine if the person is authorized based on the composite facial image, and in response to the transmitting, receiving a response to the request, wherein. if the person is authorized, adding the person to a database of authorized persons, and if the person is not authorized, adding the person to a database of suspicious persons.

In another embodiment of the second aspect analyzing the first image data and the second image data comprises identifying first facial features from the first image data and second facial features from the second image data; and comparing the first facial features and the second facial features.

In a third aspect, a computer program application is provided for analyzing image data from at least a first audio/video (A/V) recording and communication device having a first camera and a second A/V recording and communication device having a second camera, the computer program application being embodied in code executable by a processor, which when executed causes the computer program application to receive first image data from the first camera and second image data from the second camera, analyze the first image data and the second image data, based on the analyzing, determine that the first image data includes a first partial facial image of a face of a person and the second image data includes a second partial facial image of the face of the person, the first partial facial image including a first portion of the face of the person and the second partial facial image not including the first portion of the face of the person, generate a composite facial image of the person based, at least in part, on the first partial facial image and the second partial facial image, and generate and transmit, to a client device, a user alert including the composite facial image.

In an embodiment of the third aspect, the user alert includes streaming video footage recorded by at least one of the first camera of the first A/V recording and communication device and the second camera of the second A/V recording and communication device.

In another embodiment of the third aspect, the first and second A/V recording and communication devices are associated with a same user.

In another embodiment of the third aspect, the first and second A/V recording and communication devices are installed at a same address.

In another embodiment of the third aspect, the code is executed by a processor of a hub device in network communication with the first and second A/V recording and communication devices.

In another embodiment of the third aspect, the code is executed by a processor of the first A/V recording and communication device.

In another embodiment of the third aspect, the first and second A/V recording and communication devices are associated with different users.

In another embodiment of the third aspect, the first and second A/V recording and communication devices are installed at different addresses.

In another embodiment of the third aspect, the composite facial image is a three-dimensional projection of a head of the person.

In another embodiment of the third aspect, the composite facial image is programmed to be rotatable by a user of the client device.

Another embodiment of the third aspect further comprises comparing the composite facial image to a database of suspicious persons, based on the comparing, determining that the person is a suspicious person, based on the determining that the person is a suspicious person, retrieving information about the person from the database, and transmitting the retrieved information with the user alert including the composite facial image.

Another embodiment of the third aspect, further comprises transmitting a request to the client device to determine if the person is authorized based on the composite facial image, and in response to the transmitting, receiving a response to the request, wherein if the person is authorized, adding the person to a database of authorized persons, and if the person is not authorized, adding the person to a database of suspicious persons.

In another embodiment of the third aspect, a computer program application is provided wherein analyzing the first image data and the second image data comprises identifying first facial features from the first image data and second facial features from the second image data and comparing the first facial features and the second facial features.

In a fourth aspect, a method for generating an alert including a composite facial image of a face of a person using image data from at least a first audio/video (A/V) recording and communication device having a first camera and a second A/V recording and communication device having a second camera is provided, the method comprising receiving first image data from the first camera and second image data from the second camera, receiving a request from a first client device to provide the alert and to transmit the first image data to at least one second client device, in response to receiving the request, analyzing the first image data and the second image data, based on the analyzing, determining that the first image data includes a first partial facial image of the person and the second image data includes a second partial facial image of the person, wherein the first partial facial image includes a first portion of the face of the person and the second partial facial image does not include the first portion of the face of the person, generating the composite facial image of the person based, at least in part, on the first partial facial image and the second partial facial image, and generating and transmitting, to the at least one second client device, the alert including the first image data and the composite facial image.

In an embodiment of the fourth aspect, the alert includes streaming video footage recorded by at least one of the first camera of the first A/V recording and communication device and the second camera of the second A/V recording and communication device.

In another embodiment of the fourth aspect, the method is performed by a hub device in network communication with the first and second A/V recording and communication devices.

In another embodiment of the fourth aspect, the first and second A/V recording and communication devices are associated with different users.

In another embodiment of the fourth aspect, the first and second A/V recording and communication devices are installed at different addresses.

Another embodiment of the fourth aspect further comprises comparing the composite facial image to a database of suspicious persons, based on the comparing, determining that the person is a suspicious person, based on the determining that the person is a suspicious person, retrieving information about the person from the database, and transmitting the retrieved information with the user alert including the composite facial image.

Another embodiment of the fourth aspect further comprises transmitting a request to the client device to determine if the person is authorized based on the composite facial image, and in response to the transmitting, receiving a response to the request, wherein if the person is authorized, adding the person to a database of authorized persons, and if the person is not authorized, adding the person to a database of suspicious persons.

In another embodiment of the fourth aspect, analyzing the first image data and the second image data comprises identifying first facial features from the first image data and second facial features from the second image data, and comparing the first facial features and the second facial features.

In a fifth aspect, a method for generating an alert including a composite facial image of a face of a person using image data from a plurality of audio/video (A/V) recording and communication devices each having a camera is provided, the method comprising receiving a neighborhood join request from a first client device associated with a first one of the plurality of A/V recording and communication devices, in response to a first motion event, receiving first image data from a first camera of the first A/V recording and communication device, in response to a second motion event, receiving second image data from a second camera of a second one of the A/V recording and communication devices, the second A/V recording and communication device being associated with a second client device, in response to receiving the neighborhood join request, determining that the first motion event and the second motion event satisfy a predetermined relationship, based on the determining, analyzing the first image data and the second image data, based on the analyzing, determining that the first image data includes a first partial facial image of the person and the second image data includes a second partial facial image of the person, wherein the first partial facial image includes a first portion of the face of the person and the second partial facial image does not include the first portion of the face of the person, generating the composite facial image of the person based, at least in part, on the first partial facial image and the second partial facial image, and generating and transmitting, to at least one of the first and second client devices, the alert including the composite facial image.

In an embodiment of the fifth aspect, the alert includes streaming video footage recorded by at least one of the first camera of the first A/V recording and communication device and the second camera of the second A/V recording and communication device.

In another embodiment of the fifth aspect, the first and second A/V recording and communication devices are associated with different users.

In another embodiment of the fifth aspect, the first and second A/V recording and communication devices are installed at different addresses.

In another embodiment of the fifth aspect, the predetermined relationship includes at least one of a temporal relationship and a proximity relationship between the first and second motion events.

In another embodiment of the fifth aspect, the temporal relationship includes a time gap between the first and second motion events.

In another embodiment of the fifth aspect, the time gap is less than 10 minutes.

In another embodiment of the fifth aspect, the proximity relationship includes a distance between the first and second A/V recording and communication devices.

In another embodiment of the fifth aspect, the distance is less than a mile.

In another embodiment of the fifth aspect, the alert including the composite facial image is transmitted to a plurality of additional client devices.

In another embodiment of the fifth aspect, determining that the first motion event and the second motion event satisfy a predetermined relationship includes at least one of determining that the first motion event and the second motion event occurred within a predetermined time gap and determining that the first A/V recording and communication device is within a predetermined distance from the second A/V recording and communication device.

BRIEF DESCRIPTION OF THE DRAWINGS

The various embodiments of the present generating composite facial images using audio/video recording and communication devices now will be discussed in detail with an emphasis on highlighting the advantageous features. These embodiments depict the novel and non-obvious generating composite facial images using audio/video recording and communication devices shown in the accompanying drawings, which are for illustrative purposes only. These drawings include the following figures, in which like numerals indicate like parts.

DETAILED DESCRIPTION

Figure 1:
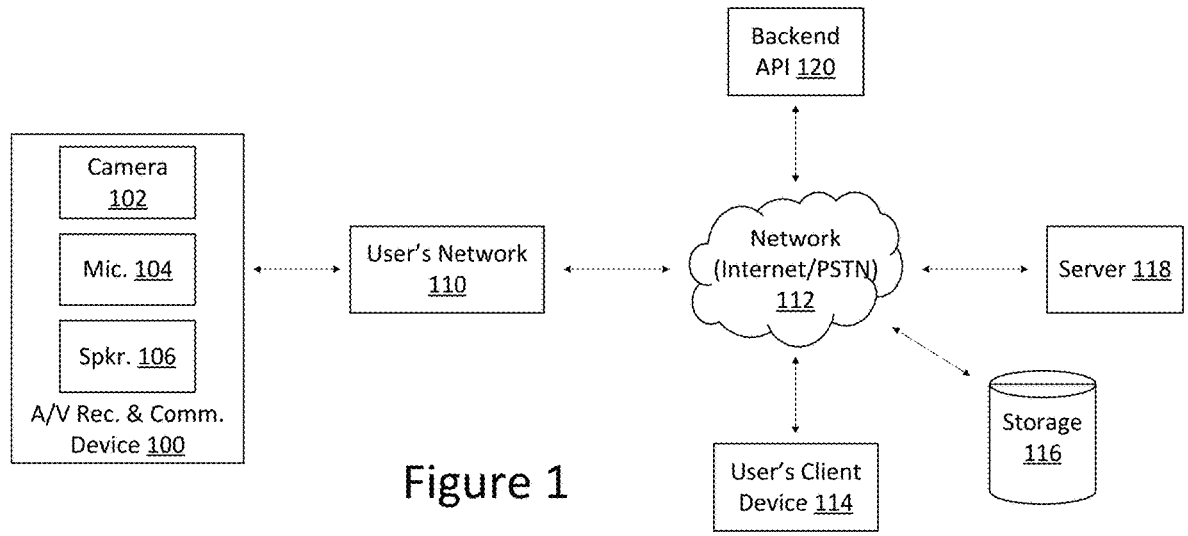
FIG. 1 is a functional block diagram illustrating one embodiment of a system including an A/V recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present streaming and storing video for audio/video recording and communication devices are described below with reference to the figures. These figures, and their written descriptions, indicate that certain components of the apparatus are formed integrally (e.g., a single unitary piece), and certain other components are formed as separate pieces. Components shown and described herein as being formed integrally may in alternative embodiments be formed as separate pieces. Further, components shown and described herein as being formed as separate pieces may in alternative embodiments be formed integrally.

With reference to FIG. 1, the present embodiments include an audio/video (A/V) recording and communication device 100. The A/V recording and communication device 100 may in some of the present embodiments comprise a doorbell, and may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, 4K, or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN (e.g., RingNet), RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, Global Navigation Satellite System (GNSS), such as a Global Positioning System (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some of the present embodiments).

The video images captured by the camera 102 of the A/V recording and communication device 100 (and the audio captured by the microphone 104) may be uploaded to the cloud and recorded on the remote storage device 116 (FIG. 1). In some of the present embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some of the present embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
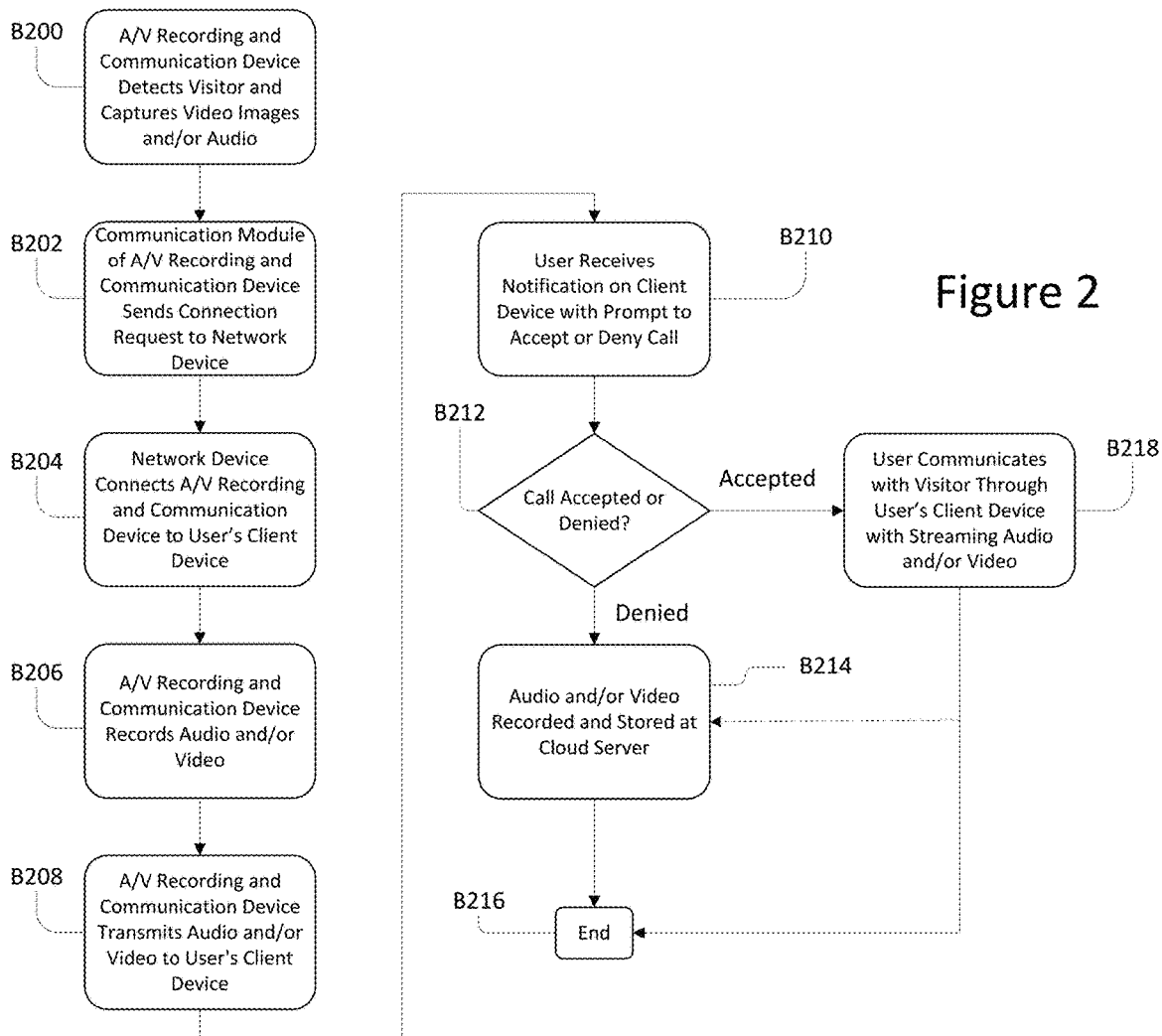
FIG. 2 is a flowchart illustrating one embodiment of a process for streaming and storing A/V content from an A/V recording and communication device according to various aspects of the present disclosure.

FIG. 2 is a flowchart illustrating a process for streaming and storing A/V content from an A/V recording and communication device according to various aspects of the present disclosure. At block B200, the A/V recording and communication device 100 detects the visitor's presence and begins capturing video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication device 100 and the session ends at block B216. In some of the present embodiments, the audio and/or video data may be recorded and stored at a cloud server (block B214) even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some of the present embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

Figure 3:
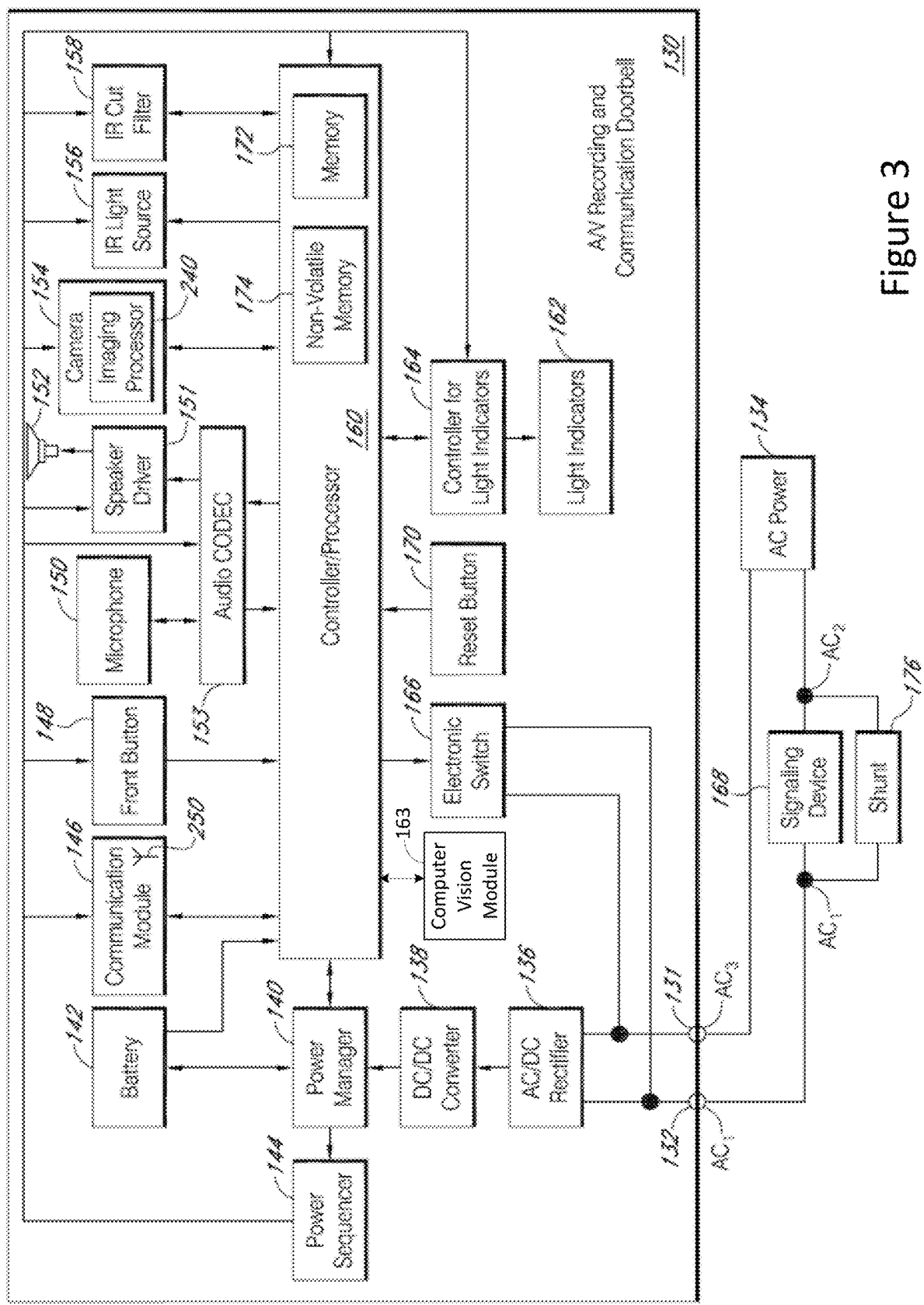
FIG. 3 is a functional block diagram illustrating an embodiment of an A/V recording and communication doorbell according to the present disclosure.

FIGS. 3-13 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some of the present embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
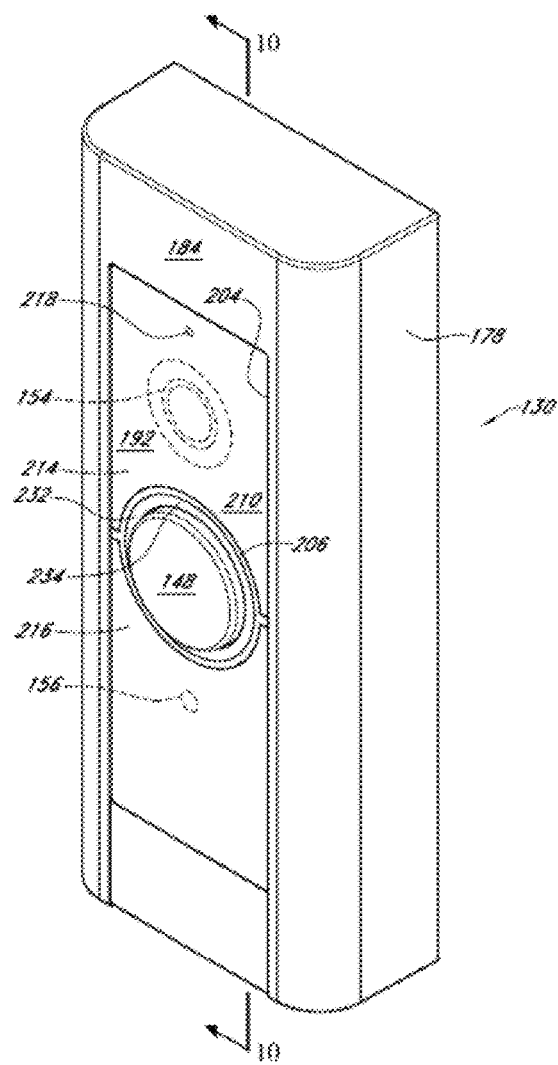
FIG. 4 is a front perspective view of an embodiment of an A/V recording and communication doorbell according to the present disclosure.
Figure 5:
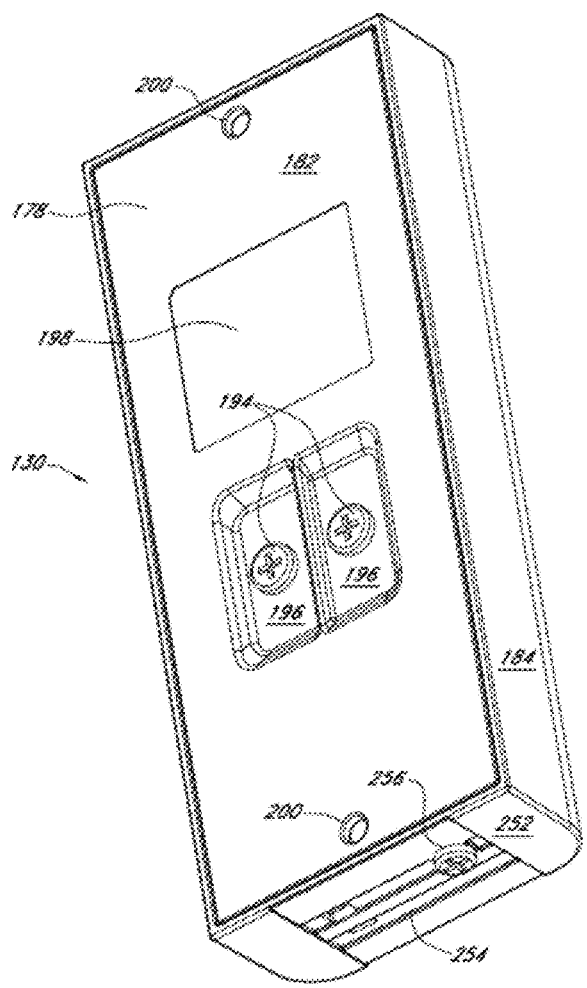
FIG. 5 is a rear perspective view of the A/V recording and communication doorbell of FIG. 4.
Figure 6:
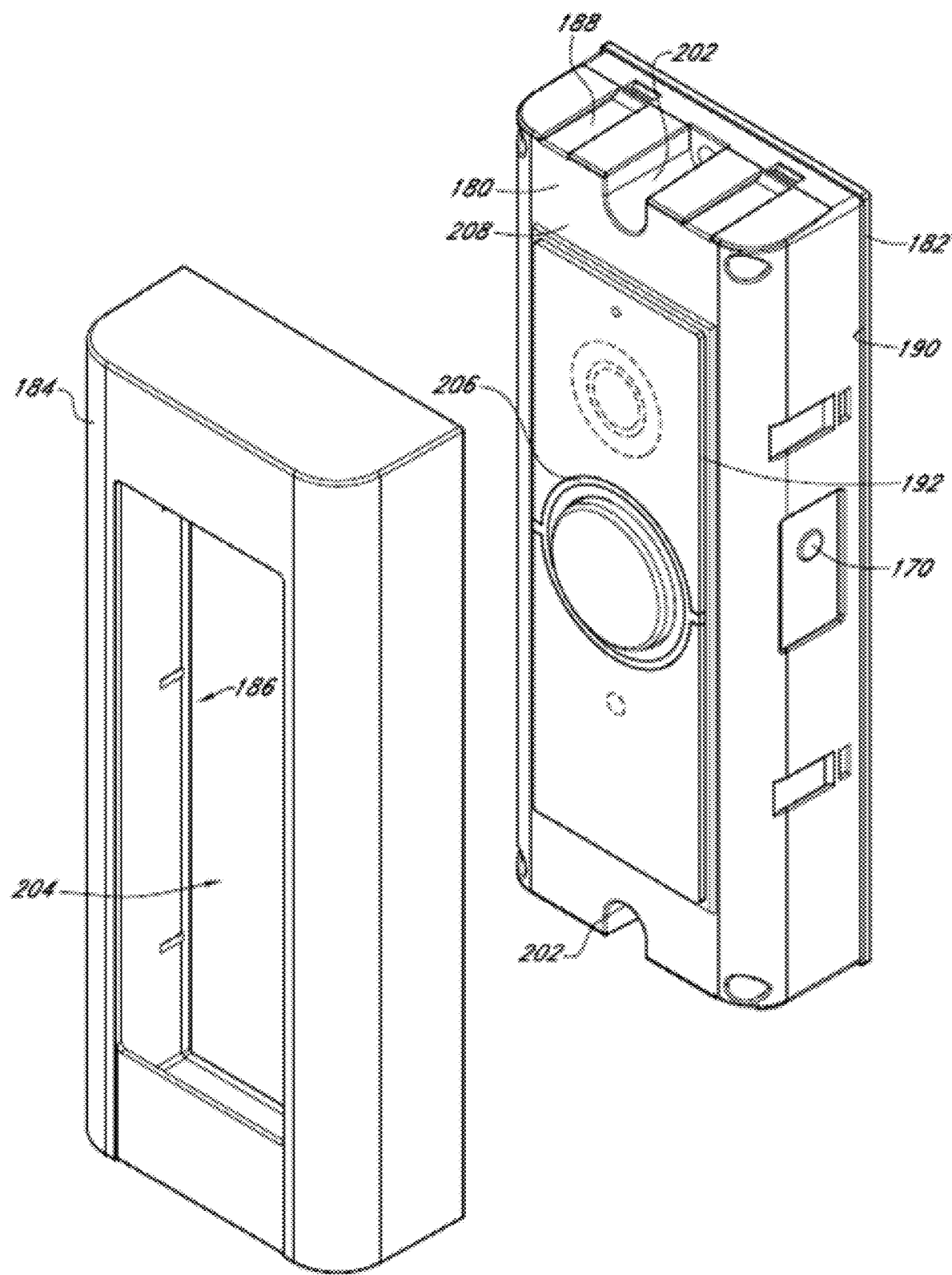
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close-fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some of the present embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
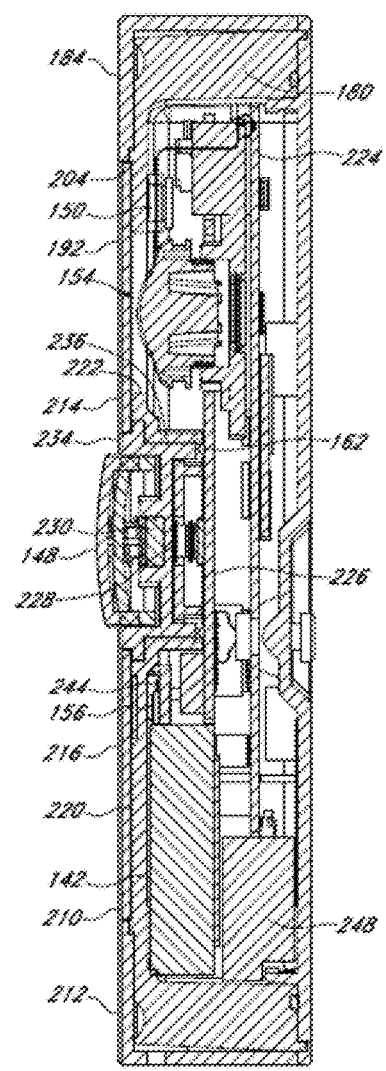
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
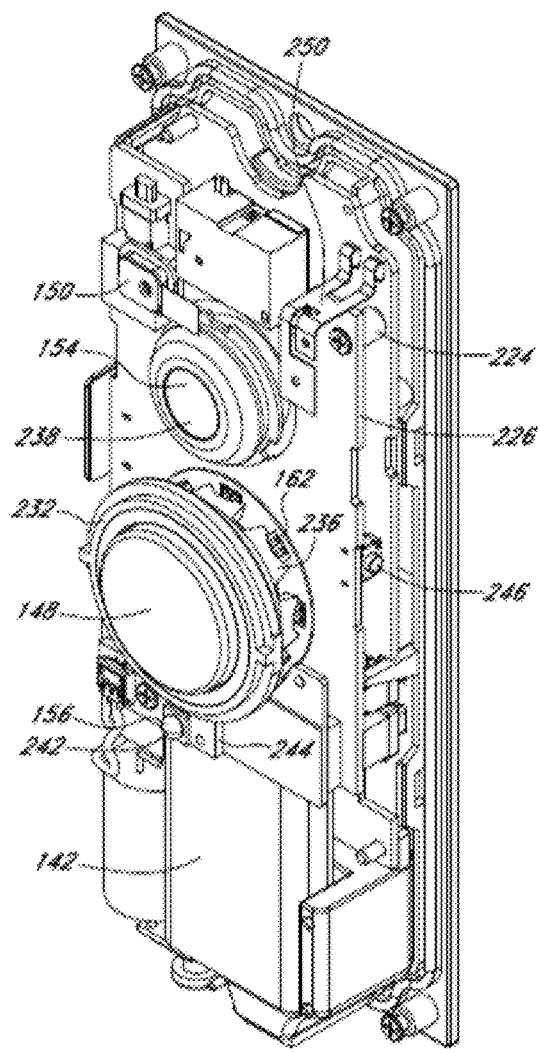
FIGS. 7-9 are front perspective views of various internal components of the A/V recording and communication doorbell of FIG. 4.
Figure 8:
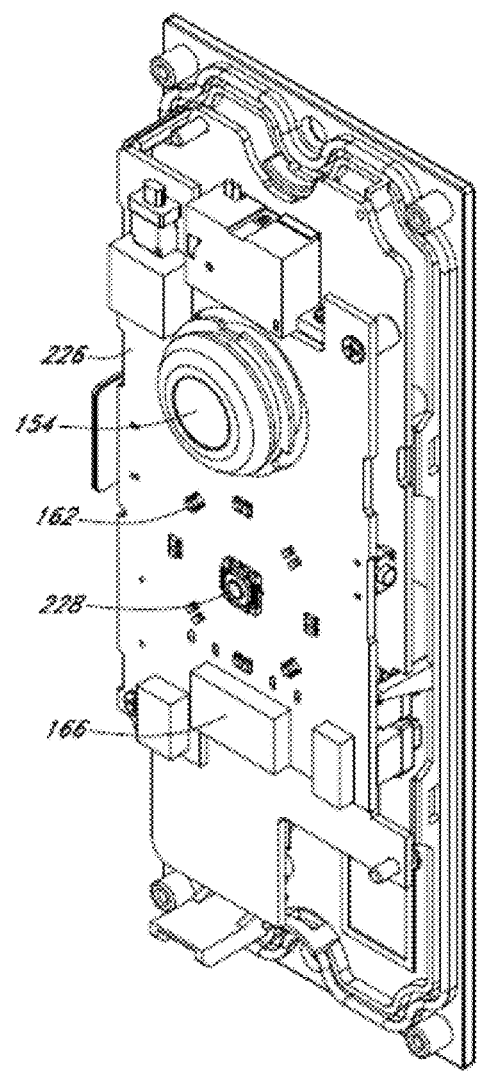
Figure 9:
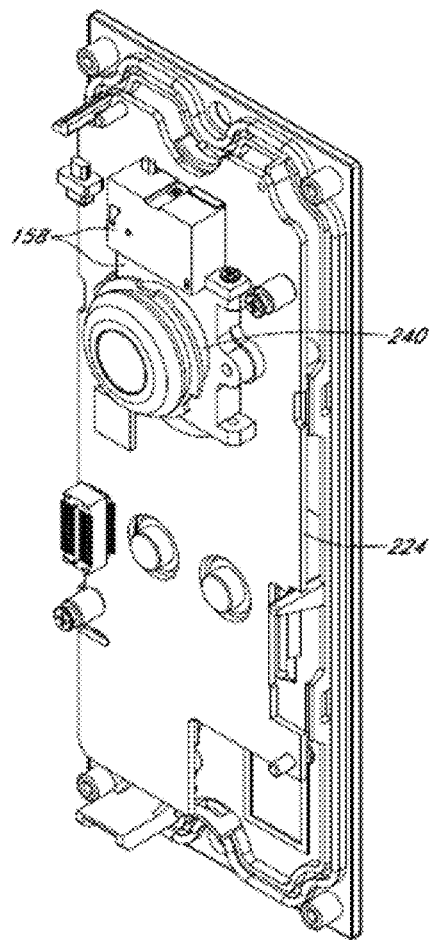

FIGS. 7-10 illustrate various internal components of the A/V recording and communication doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wired/wireless network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134 but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226 and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some of the present embodiments, the camera 154 acts as a light detector for use in controlling the current state of the IR cut filter 158 and turning the IR LED 242 on and off. Using the camera 154 as a light detector is facilitated in some of the present embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
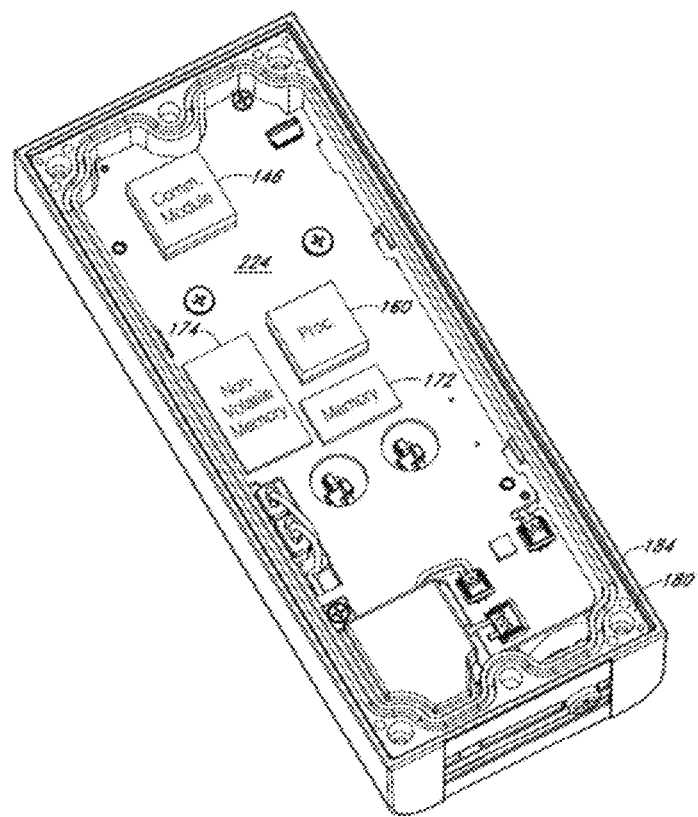
FIGS. 11-13 are rear perspective views of various internal components of the A/V recording and communication doorbell of FIG. 4.
Figure 12:
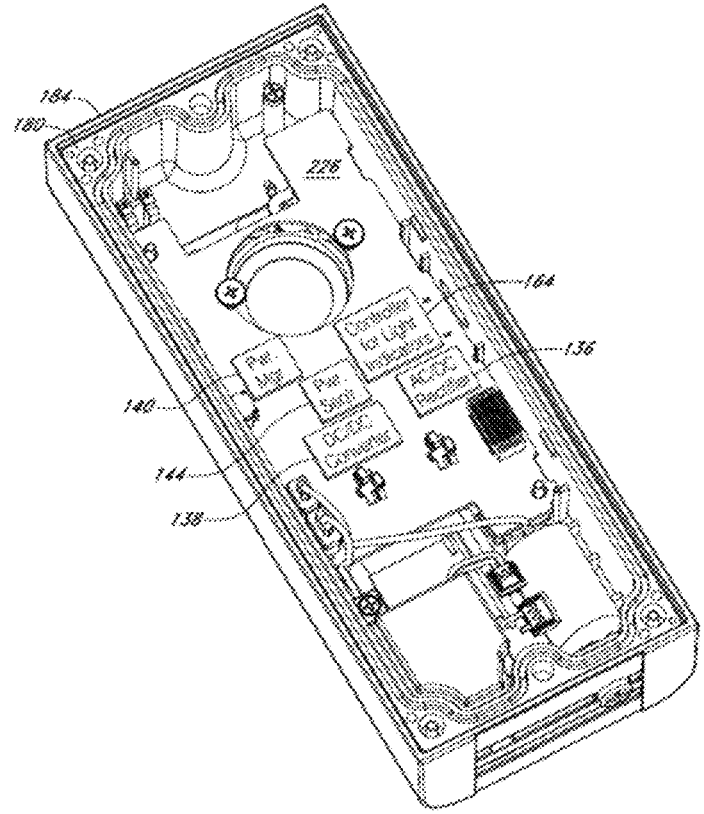
Figure 13:
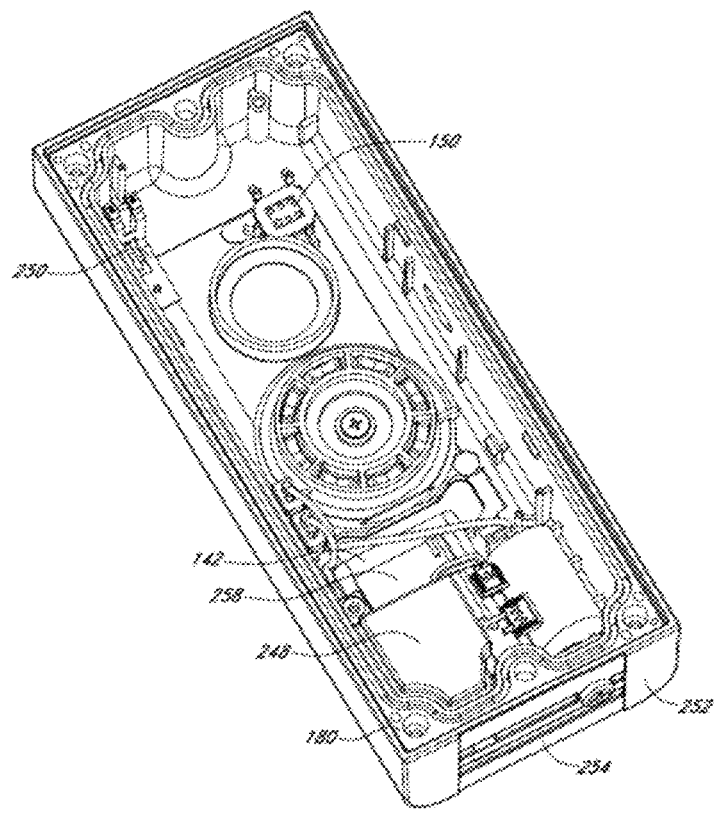

FIGS. 11-13 further illustrate internal components of the A/V recording and communication doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some of the present embodiments, the rechargeable battery 142 may include a thermally sensitive resistor ("thermistor," not shown) operatively connected to the processor 160 so that the battery 142's temperature can be monitored, and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some of the present embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 16:
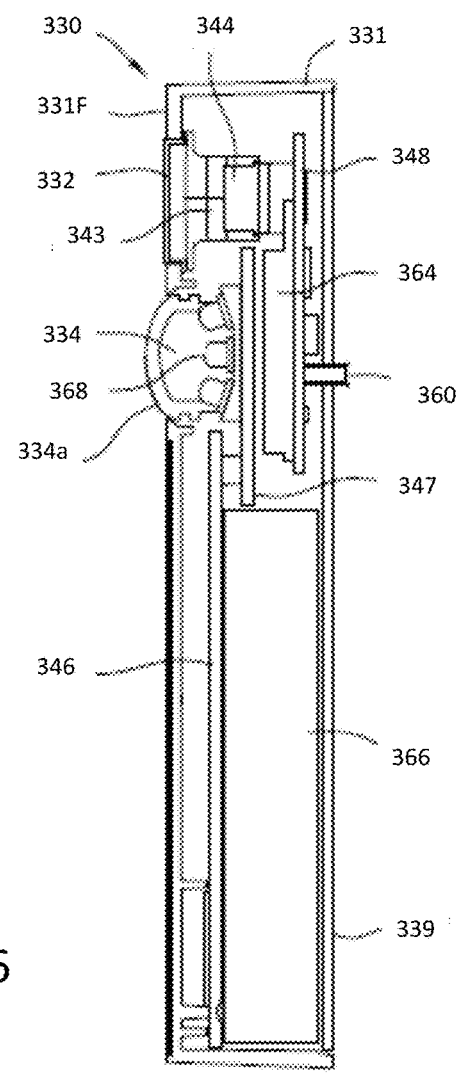
FIG. 16 is cross-sectional right-side view of the A/V recording and communication doorbell of FIG. 14.
Figure 14:
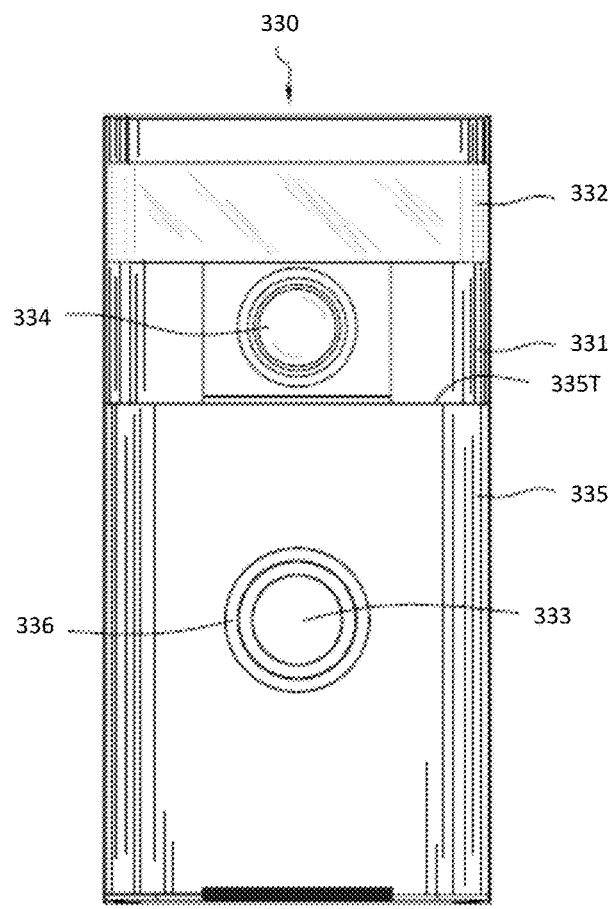
FIG. 14 is a front view of another embodiment of an A/V recording and communication doorbell according to various aspects of the present disclosure.
Figure 15:
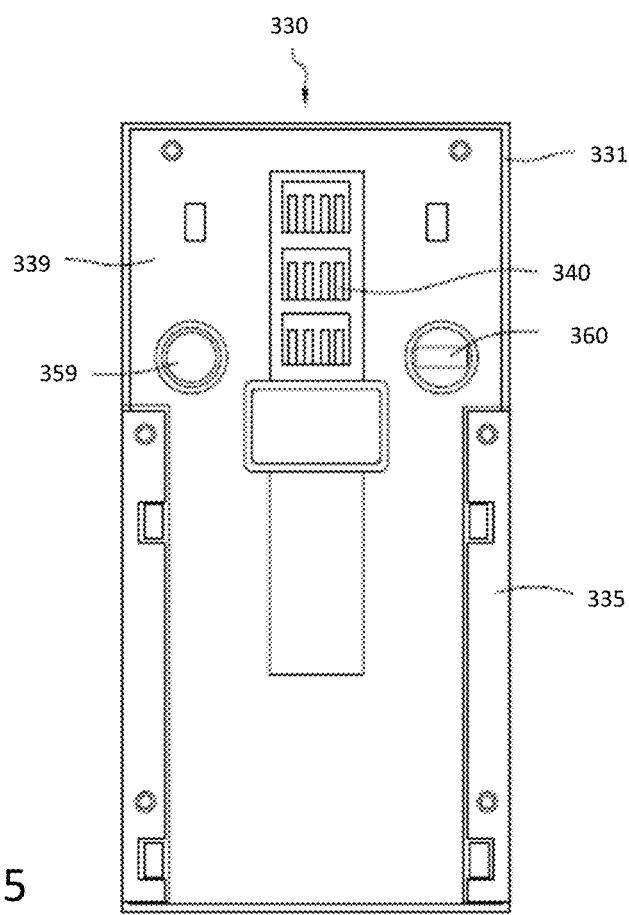
FIG. 15 is a rear view of the A/V recording and communication doorbell of FIG. 14.
Figure 17:
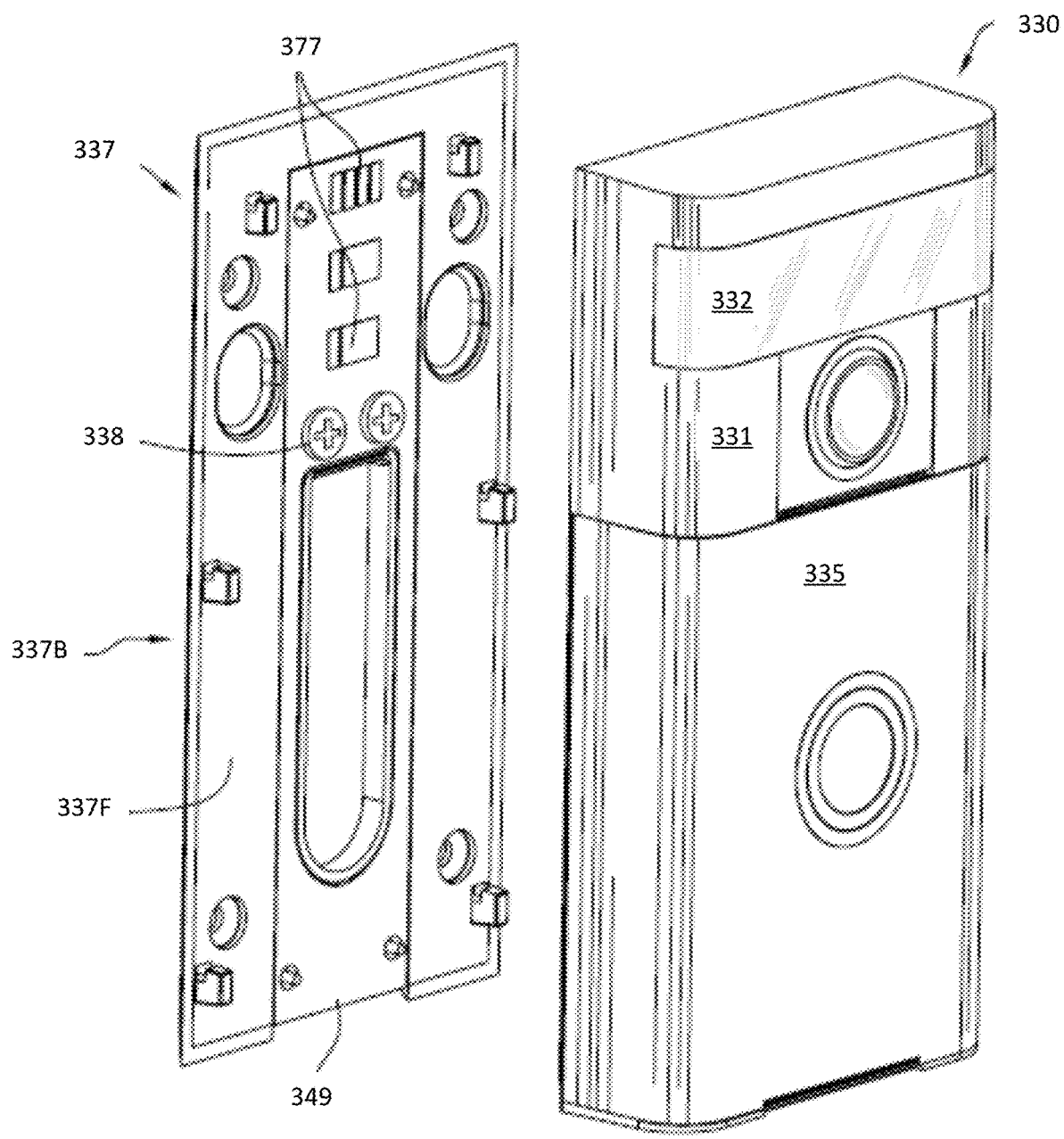
FIG. 17 is an exploded view of the A/V recording and communication doorbell of FIG. 14 and a mounting bracket.

FIGS. 14-18 illustrate another embodiment of an audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 3 and 4, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some of the present embodiments the material of the enclosure 331 preferably permits infrared light to pass through from inside the doorbell 330 to the environment and vice versa. The doorbell 330 further includes a lens 332. In some of the present embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339 and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334a of the camera 334 protrudes through an opening in the enclosure 331. The camera lens 334a may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 can clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344, which are secured on or within a PIR sensor holder 343, and the assembly resides behind the lens 332. In some of the present embodiments, the doorbell 330 may comprise three PIR sensors 344, as further described below, but in other embodiments any number of PIR sensors 344 may be provided. In some of the present embodiments, one or more of the PIR sensors 344 may comprise a pyroelectric infrared sensor. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
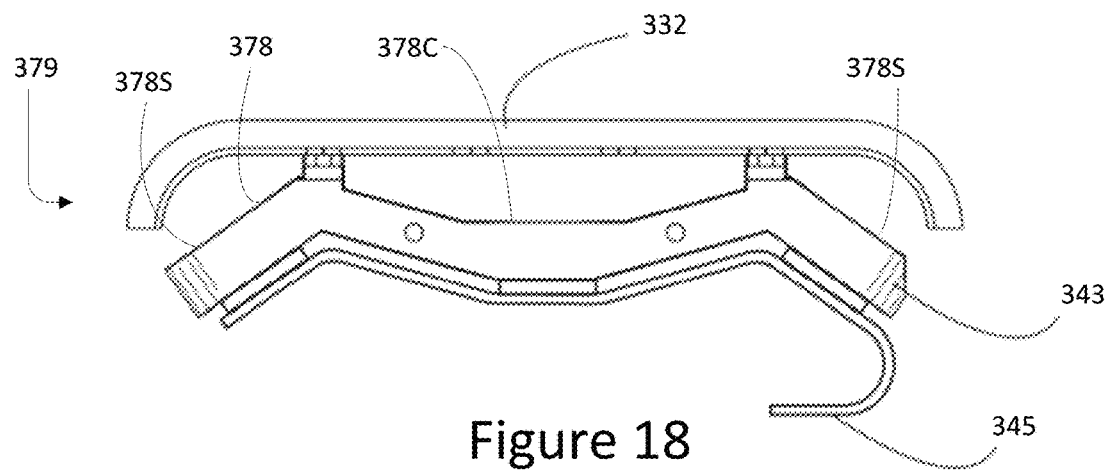
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330 and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334 and connect to the back plate 339 as described above. The lens 332 may extend and curl partially around the side of the doorbell 330. The enclosure 331 may extend and curl around the side and top of the doorbell 330 and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
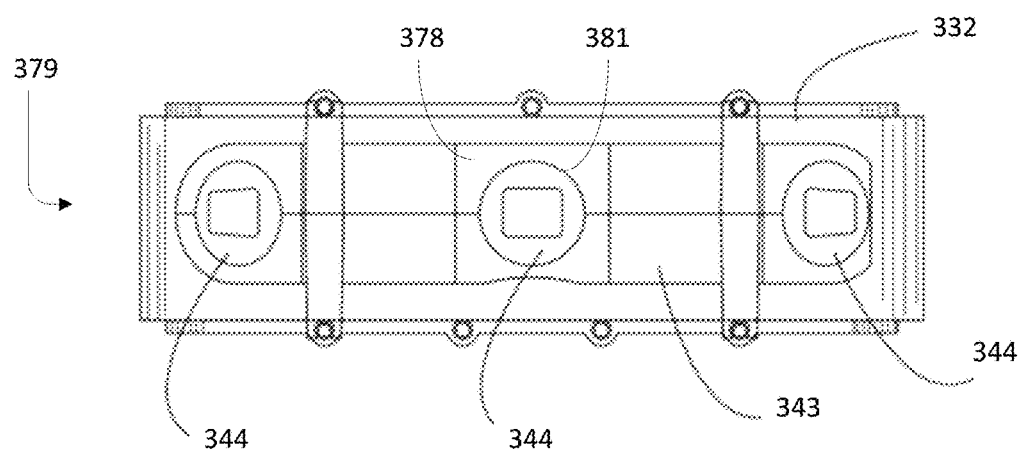
FIG. 19 is a front view of the passive infrared sensor assembly of FIG. 18.

FIG. 18 is a top view and FIG. 19 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 19, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 18, the passive infrared sensor holder 143 may be secured to the rear face of the lens 132. The flexible power circuit 145 may be any material or component capable of delivering power and/or data to and from the passive infrared sensors 144 and may be contoured to conform to the non-linear shape of the passive infrared sensor holder 143. The flexible power circuit 145 may connect to, draw power from, and/or transmit data to and from, the power printed circuit board 148.

Figure 20:
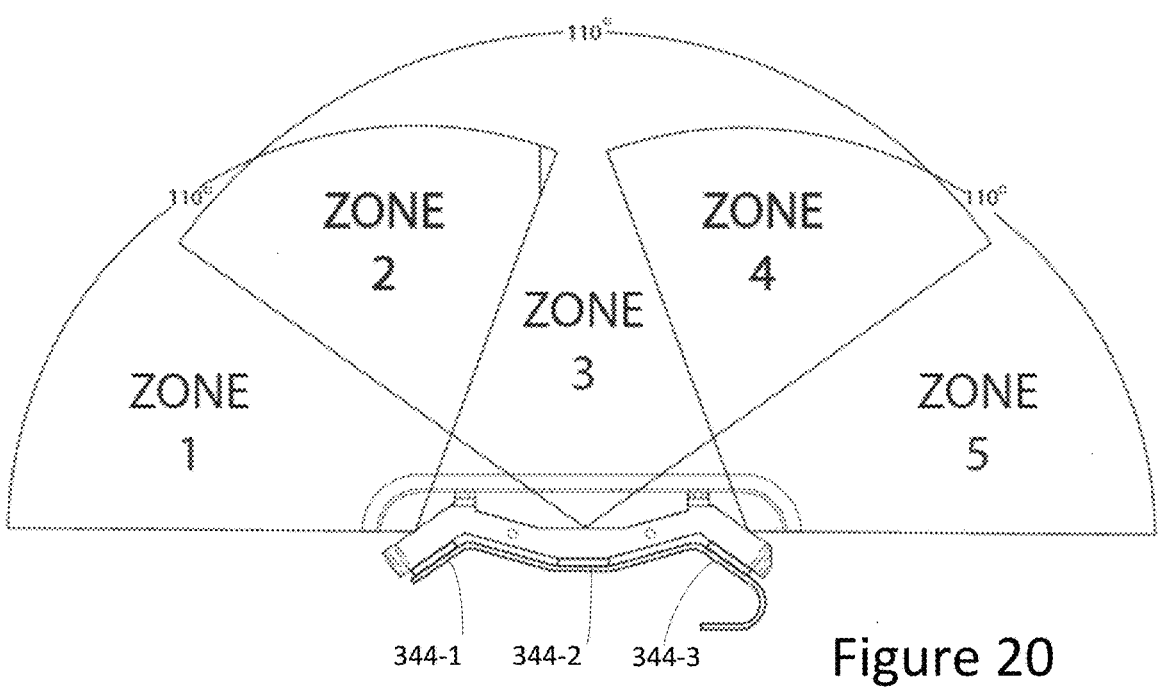
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some of the present embodiments, the doorbell 130 may be capable of determining the direction that an object is moving based upon which zones are triggered in a time sequence.

Figure 21:
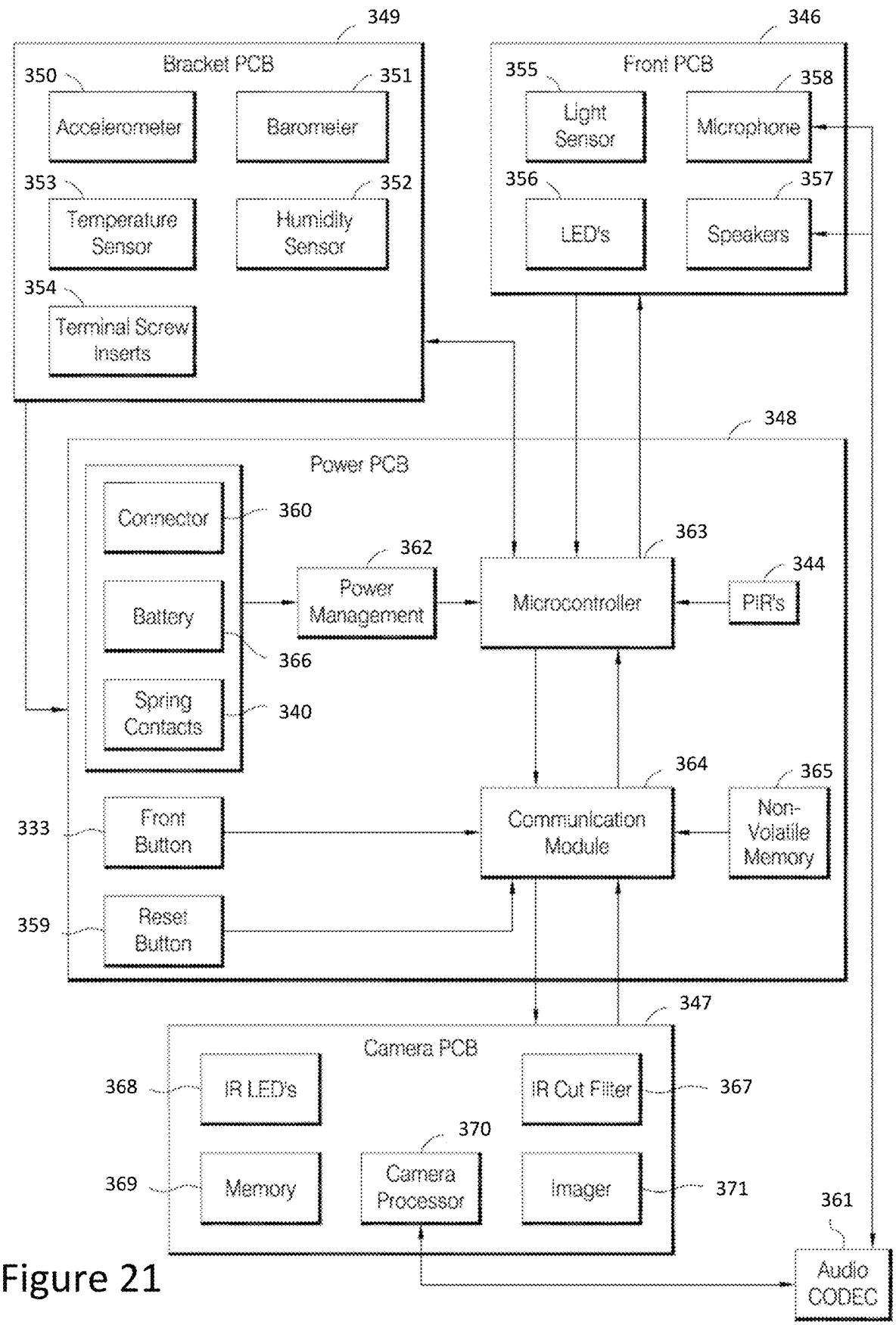
FIG. 21 is a functional block diagram of the components of the A/V recording and communication doorbell of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell can receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electromechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some of the present embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

As described above, one aspect of the present embodiments includes the realization that audio/video (A/V) recording and communication devices (e.g., doorbells) other than the present embodiments sometimes capture only partial facial images of persons in the field of view of the camera. Partial facial images sometimes do not provide enough information to allow for a positive identification of the person in the video or still image. The present embodiments solve this problem by leveraging the functionality of A/V recording and communication devices, such as A/V recording and communication doorbells, to generate composite facial images based on partial facial image(s) captured by multiple cameras. These composite facial images provide a more easily identifiable picture of the person(s) in the field of view of the camera, which facilitates positive identification of criminal perpetrators, thereby enhancing public safety by making it easier for such perpetrators to be apprehended and convicted.

In particular, sometimes the cameras of two or more A/V recording and communication devices each capture partial facial images (e.g., from different angles and/or vantage points) of the same person. The partial facial images can be of limited value in identifying the person(s) in the images, due to the lack of a complete picture of the person's face in any one image. It would be advantageous, then, if partial facial images could be combined to form a composite image that shows the entire face (or at least a more complete face) of a person captured in multiple images. But A/V recording and communication devices other than the present embodiments do not provide the ability to identify image data including partial facial images from two or more cameras, or to determine that the partial facial images are of the same person. The present embodiments solve this problem by enabling image data from multiple A/V recording and communication devices to be analyzed so that partial facial images of a same person can be identified. The partial facial images of the same person are then combined in the present embodiments to generate a composite facial image of a complete face of the person (or at least a more complete face than any of the partial images alone). With a composite facial image, the identity of the person in the partial facial images can be more effectively determined, thereby enabling users to make more educated decisions of whether the person is suspicious or dangerous, and also whether or not to notify law enforcement, family members, neighbors, or the like. The composite facial image can also make it easier for law enforcement to identify, apprehend, and convict the criminal perpetrator (in instances where the person in the composite facial image has committed one or more criminal acts).

In some embodiments, the combined partial facial images may be obtained from two or more A/V recording and communication devices that are located at different properties/addresses and/or associated with different client devices (e.g., different users). In other embodiments, the combined partial facial images may be obtained from two or more A/V recording and communication devices that are located at a same property/address and/or associated with a same client device (e.g., a single user). In still further embodiments, the combined partial facial images may be obtained from a single A/V recording and communication device that captures images of the person from multiple angles.

For example, some of the present embodiments generate a composite facial image by receiving first image data from a first camera of a first A/V recording and communication device and second image data from a second camera of a second A/V recording and communication device, and analyzing the first image data and the second image data. Based on the analyzing, it is determined that the first image data includes a first partial facial image of the person and the second image data includes a second partial facial image of the person, where the first partial facial image includes a first portion of the face of the person and the second partial facial image does not include the first portion of the face of the person. In other words, the first and second partial facial images do not depict identical portions of the person's face. Based, at least in part, on the first partial facial image and the second partial facial image, the composite facial image of the person is generated. In some embodiments, a user alert including the composite facial image may also be generated and transmitted to a client device.

In various embodiments, these steps can be carried out either entirely within the A/V recording and communication device(s), or with the use of the A/V recording and communication device(s) and one or more backend processors, one or more databases, one or more hub devices in network communication with the A/V recording and communication device(s), and/or one or more networks enabling communication between the devices that make up the described system.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present A/V recording and communication doorbell 130 may include a computer vision module 163. The computer vision module 163 may include any of the components (e.g. hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to, re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many core DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

Figure 22:
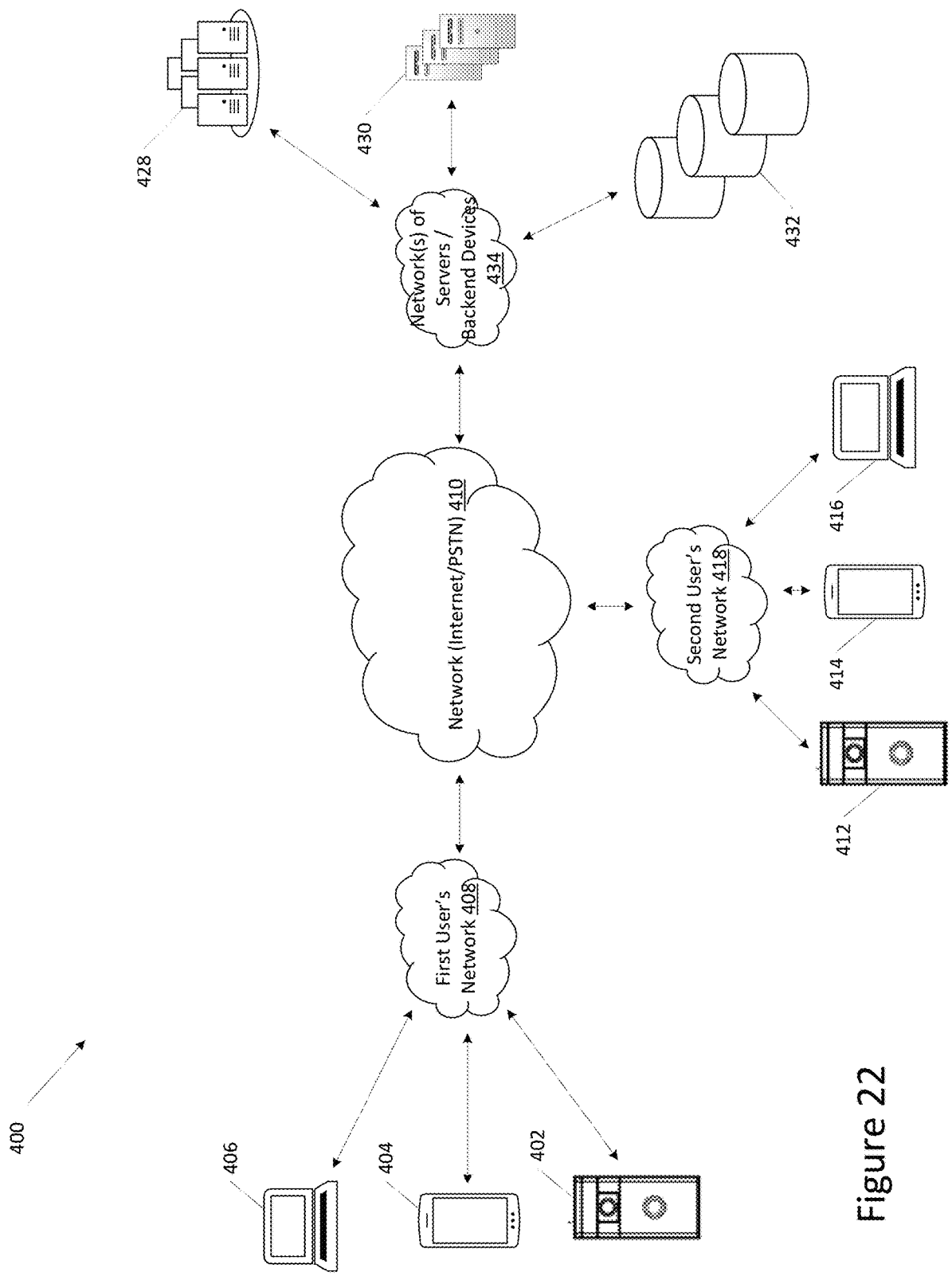
FIG. 22 is a functional block diagram illustrating a system for communicating in a network according to various aspects of the present disclosure.

FIG. 22 is a functional block diagram illustrating a system 400 for communicating in a network according to various aspects of the present disclosure. The system 400 may include one or more first audio/video (A/V) recording and communication devices 402 configured to access a first user's network 408 to connect to a network (Internet/PSTN) 410. The first user's network 408 may include any or all of the components and/or functionality of the user's network 110 described herein. The system 400 may also include one or more first client devices 404, 406, which in various embodiments may be configured to be in network communication with the first A/V recording and communication device 402. The first client devices 404, 406 may comprise, for example, a mobile phone such as a smartphone, or a computing device such as a tablet computer, a laptop computer, a desktop computer, etc. The first client devices 404, 406 may include any or all of the components and/or functionality of the client device 114 and/or the client device 850 described herein. In some embodiments, the first client devices 404, 406 may not be associated with a first A/V recording and communication device 402. In other words, the user/owner of the first client device(s) 404, 406 may not also use/own a first A/V recording and communication device 402.

In various embodiments, the system 400 may also include one or more second A/V recording and communication devices 412 configured to access a second user's network 418 to connect to the network (Internet/PSTN) 410. The second user's network 418 may include any or all of the components and/or functionality of the user's network 110 described herein. The system 400 may further include one or more second client devices 414, 416, which in various embodiments may be configured to be in network communication with the second A/V recording and communication device 412. The second client devices 414, 416 may comprise, for example, a mobile phone such as a smartphone, or a computing device such as a tablet computer, a laptop computer, a desktop computer, etc. The second client devices 414, 416 may include any or all of the components and/or functionality of the client device 114 and/or the client device 850 described herein. In some embodiments, the second client devices 414, 416 may not be associated with a second A/V recording and communication device 412, as described above. In other words, the user/owner of the second client device(s) 414, 416 may not also use/own a second A/V recording and communication device 412.

With further reference to FIG. 22, the system 400 may also include various backend devices such as (but not limited to) storage devices 432, backend servers 430, and backend APIs 428 in network communication with the first and second A/V recording and communication devices 402, 412 and their respective client devices 404, 406, 414, 416. In some embodiments, the storage devices 432 may be a separate device from the backend servers 430 (as illustrated) or may be an integral component of the backend servers 430. In some embodiments, the first and second A/V recording and communication devices 402, 412 may be similar in structure and/or function to the A/V recording and communication device 100 (FIG. 1), and/or the A/V recording and communication doorbell 130 (FIGS. 3-13), and/or the A/V recording and communication doorbell 330 (FIGS. 14-21). Also, the storage devices 432 may be similar in structure and/or function to the storage device 116 (FIG. 1). In addition, in some embodiments, the backend servers 430 and backend APIs 428 may be similar in structure and/or function to the server 118 and the backend API 120 (FIG. 1), respectively.

Figure 23:
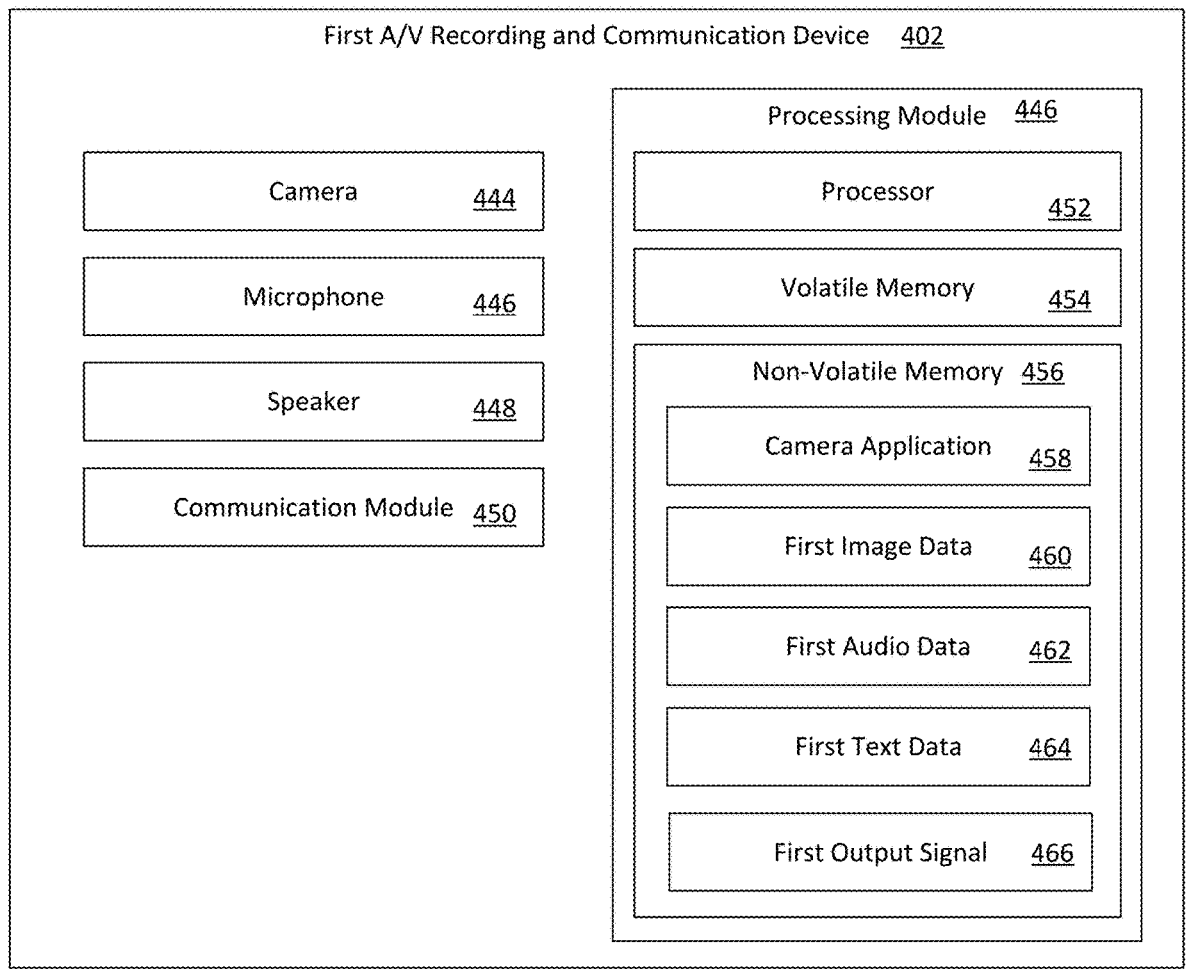
FIG. 23 is a functional block diagram illustrating one embodiment of a first A/V recording and communication device according to various aspects of the present disclosure.

FIG. 23 is a functional block diagram illustrating an embodiment of the first A/V recording and communication device 402 according to various aspects of the present disclosure. The first A/V recording and communication device 402 may comprise a processing module 442 that is operatively connected to a camera 444, a microphone 446, a speaker 448, and a communication module 450. The processing module 442 may comprise a processor 452, volatile memory 454, and non-volatile memory 456 that includes a camera application 458. In various embodiments, the camera application 458 may configure the processor 452 to capture first image data 460 using the camera 444 and first audio data 462 using the microphone 446. In some embodiments, the camera application 458 may also configure the processor 452 to generate first text data 464 describing the first image data 460. In other embodiments, the first text data 464 describing the first image data 460 may be generated by a user using the first client device 404, 406 associated with the first A/V recording and communication device 402. In addition, the camera application 458 may configure the processor 452 to transmit the first image data 460, the first audio data 462, and/or the first text data 464 to the first client device 404, 406 using the communication module 450. In various embodiments, the camera application 458 may also configure the processor 452 to generate and transmit a first output signal 466 that may include the first image data 460 and the first audio data 462. In some embodiments, the first output signal 466 may be transmitted, using the communication module 450, to the first client device 404, 406, and the first client device 404, 406 may send the first output signal 466 to the backend server(s) 430. In other embodiments, the first output signal 466 may be transmitted directly to the backend server(s) 430 using the communication module 450.

Figure 24:
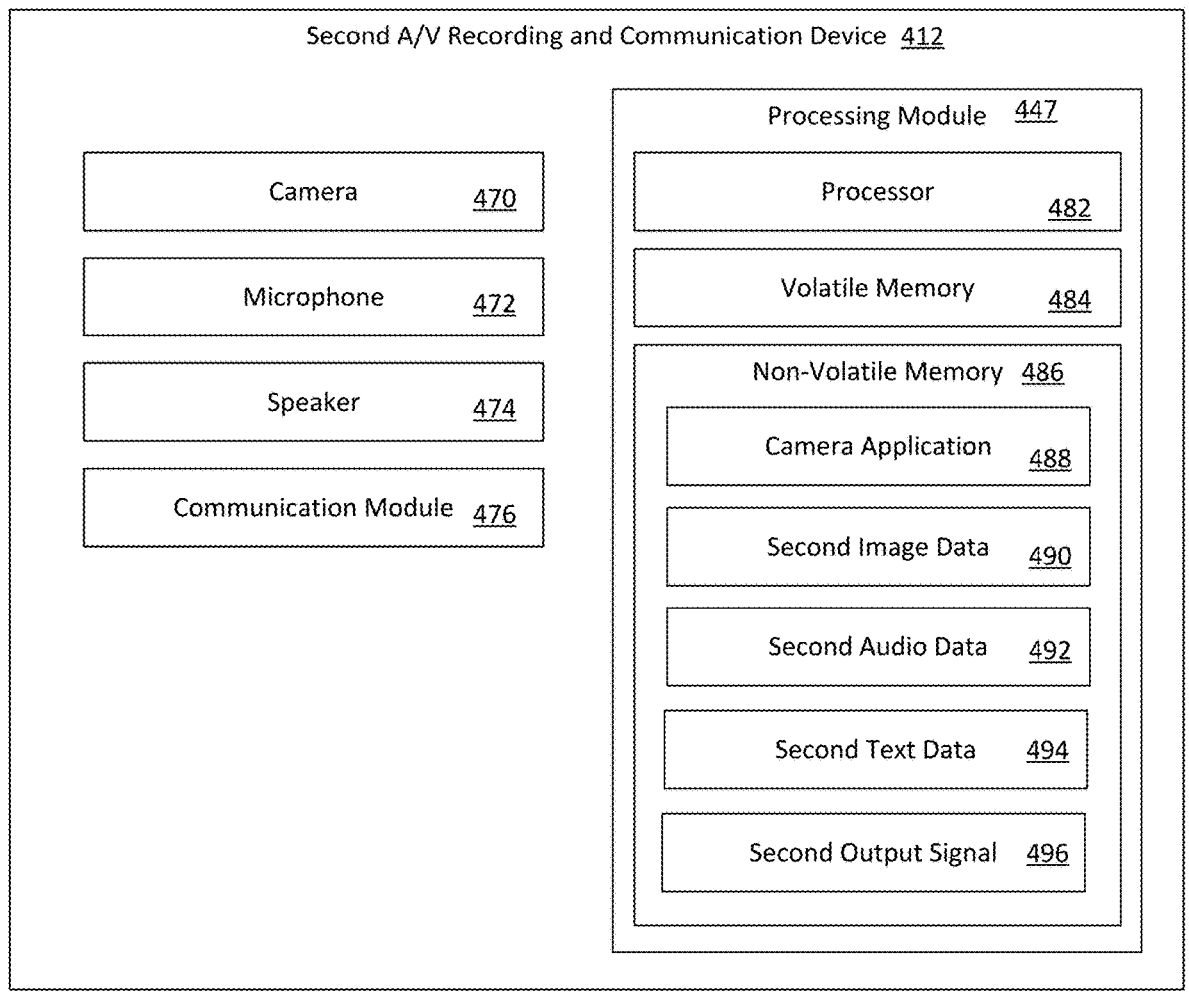
FIG. 24 is a functional block diagram illustrating one embodiment of a second A/V recording and communication device according to various aspects of the present disclosure.

FIG. 24 is a functional block diagram illustrating an embodiment of the second A/V recording and communication device 412 according to various aspects of the present disclosure. The second A/V recording and communication device 412 may comprise a processing module 447 that is operatively connected to a camera 470, a microphone 472, a speaker 474, and a communication module 476. The processing module 447 may comprise a processor 482, volatile memory 484, and non-volatile memory 486 that includes a camera application 488. In some embodiments, the camera application 488 may configure the processor 482 to capture second image data 490 using the camera 470 and second audio data 492 using the microphone 472. In some embodiments, the camera application 488 may also configure the processor 482 to generate second text data 494 describing the second image data 490. In other embodiments, the second text data 494 describing the second image data 490 may be generated by a user using the second client device 414, 416 associated with the second A/V recording and communication device 412. In various embodiments, the camera application 488 may also configure the processor 482 to generate and transmit a second output signal 496 that may include the second image data 490 and the second audio data 492. In some embodiments, the second output signal 496 may be transmitted, using the communication module 476, to the second client device 414, 416, and the second client device 414, 416 may send the second output signal 496 to the backend server(s) 430. In other embodiments, the second output signal 496 may be transmitted directly to the backend server(s) 430 using the communication module 476.

In reference to FIGS. 23 and 24, the image data 460, 490 may comprise image sensor data such as (but not limited to) exposure values and data regarding pixel values for a particular sized grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments. In addition, a communication module, such as the communication modules 446, 476 may comprise (but is not limited to) one or more transceivers and/or wireless antennas (not shown) configured to transmit and receive wireless signals. In further embodiments, the communication modules 446, 476 may comprise (but are not limited to) one or more transceivers configured to transmit and receive wired and/or wireless signals.

Figure 25:
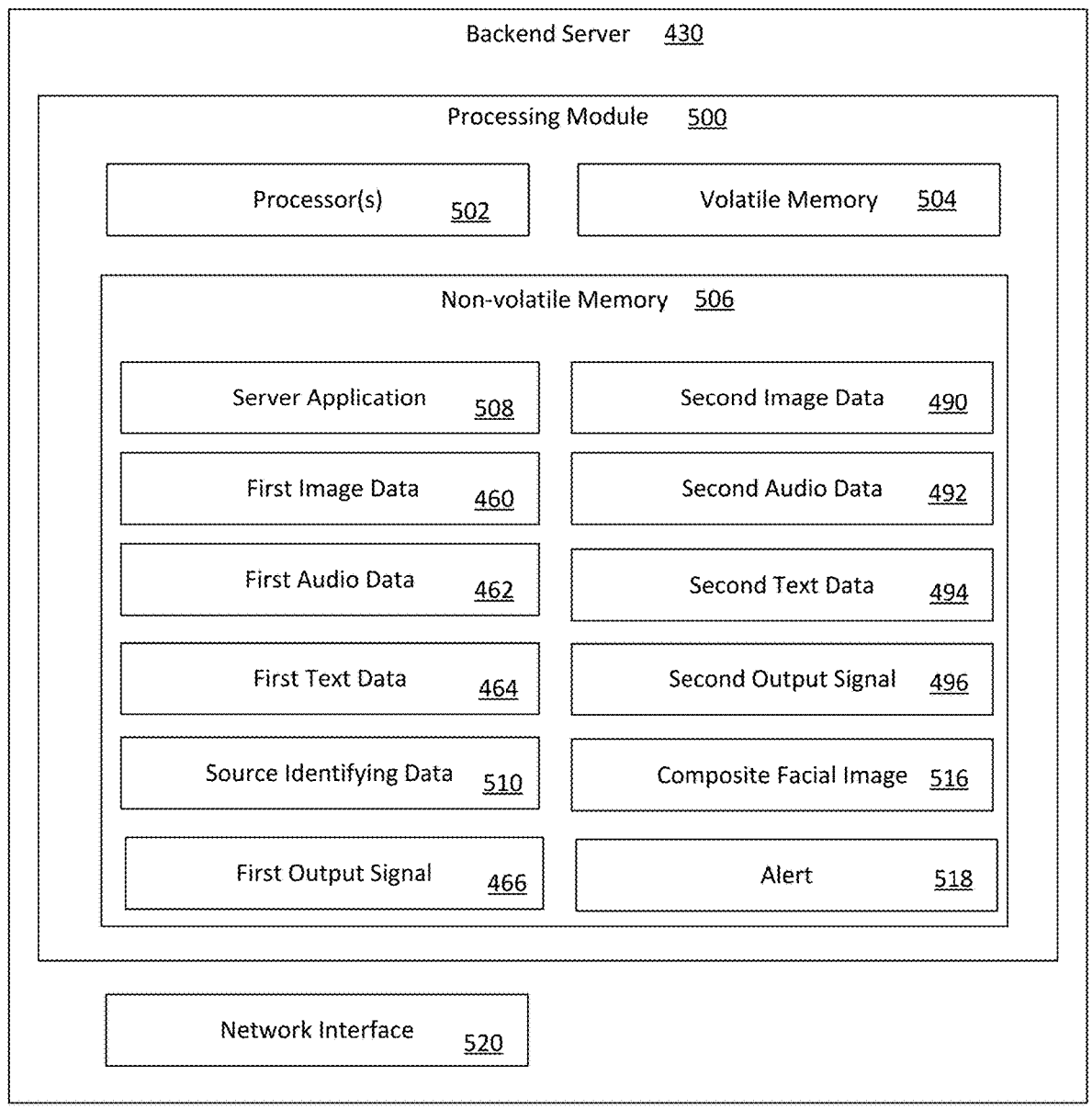
FIG. 25 is a functional block diagram illustrating one embodiment of a backend device according to various aspects of the present disclosure.

FIG. 25 is a functional block diagram illustrating one embodiment of the backend server(s) 430 according to various aspects of the present disclosure. The backend server(s) 430 may comprise a processing module 500 comprising a processor 502, volatile memory 504, a network interface 520, and non-volatile memory 506. The network interface 520 may allow the backend server(s) 430 to access and communicate with devices connected to the network (Internet/PSTN) 410. The non-volatile memory 506 may include a server application 508 that configures the processor 502 to receive the first image data 460, the first audio data 462, and/or the first text data 464 received from the first client device 404, 406 and/or the first A/V recording and communication device 402 in the first output signal 466. Further, the server application 508 may configure the processor 502 to receive the second image data 490, the second audio data 492, and/or the second text data 494 received from the second client device 414, 416 and/or the second A/V recording and communication device 412 in the second output signal 496. In various embodiments, and as described below, the backend server(s) 430 may be configured to process the first image data 460 and the second image data 490 to generate a composite facial image 516, and to transmit the composite facial image 516 to one or more second client devices 414, 416 with an alert 518. For example, the backend server(s) 430 may be configured to process the first image data 460 and the second image data 490 by comparing the first image data 460 with the second image data 490, determining whether the first image data 460 and the second image data 490 include partial facial images of the same person and, if so, generate the composite facial image 516 by combining the first image data 460 with the second image data 490. The backend server(s) 430 may then transmit the composite facial image 516 to the one or more second client devices 414, 416 with the alert 518, where the alert 518 may include at least one of the first image data 460 and the second image data 490.

In further reference to FIG. 25, the non-volatile memory 506 may also include source identifying data 510 that may be used to identify the first A/V recording and communication device 402 and/or the second A/V recording and communication device 412. In some embodiments, identifying the first A/V recording and communication device 402 and/or the second A/V recording and communication device 412 may include determining the locations of the devices 402, 412, which locations may be used to determine which second client devices 414, 416 will receive the alert 518 with the composite facial image 516. In addition, the source identifying data 510 may be used to determine locations of the first client device 404, 406 and/or the second client device 414, 416. In some embodiments, the server application 508 may further configure the processor 502 to generate and transmit a report signal (not shown) to a third-party client device (not shown), which may be associated with a law enforcement agency, for example. The report signal sent to the law enforcement agency may include information indicating an approximate location of where the first image data was captured and/or where the second image data was captured, which may assist the law enforcement agency with apprehending the criminal perpetrator shown in the image data.

In the illustrated embodiment of FIGS. 23-25, the various components including (but not limited to) the processing modules 446, 447, 500, the communication modules 450, 476, and the network interface 520 are represented by separate boxes. The graphical representations depicted in each of FIGS. 23-25 are, however, merely examples, and are not intended to indicate that any of the various components of the first A/V recording and communication device 402, the second A/V recording and communication device 412, or the backend server(s) 430 are necessarily physically separate from one another, although in some embodiments they might be. In other embodiments, however, the structure and/or functionality of any or all of the components of first A/V recording and communication device 402 may be combined. In addition, in some embodiments the communication module 450 may include its own processor, volatile memory, and/or non-volatile memory. Likewise, the structure and/or functionality of any or all of the components of the second A/V recording and communication device 412 may be combined. In addition, in some embodiments the communication module 476 may include its own processor, volatile memory, and/or non-volatile memory. Further, the structure and/or functionality of any or all of the components of the backend server(s) 430, may be combined. In addition, in some embodiments the network interface 520 may include its own processor, volatile memory, and/or non-volatile memory.

Figure 26:
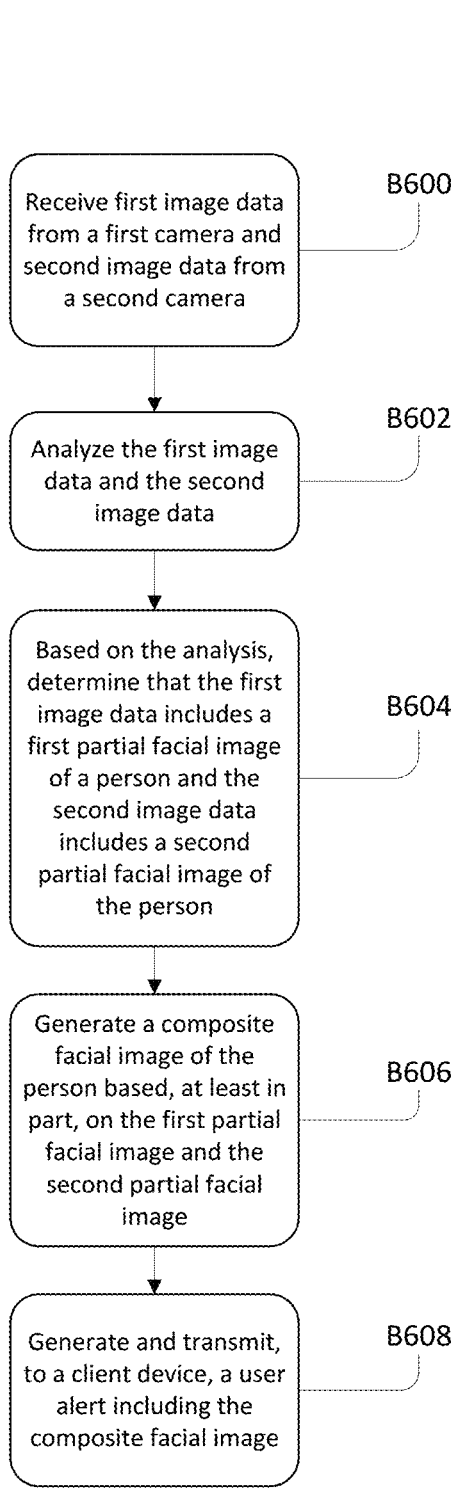
FIGS. 26-28 are flowcharts illustrating example embodiments of processes for generating composite facial images of a person according to various aspects of the present disclosure.

FIG. 26 illustrates an example embodiment of a process for generating composite facial images of a person according to various aspects of the present disclosure. At block B600, the process receives first image data from a first camera and second image data from a second camera. For example, the first image data may be received from a first camera 154 of a first A/V recording and communication doorbell 130 and the second image data may be received from a second camera 154 of a second A/V recording and communication doorbell 130. In some embodiments, the first image data and the second image data may be received at a backend server via the user's network 110 and/or the network 112.

In some embodiments, the first image data and the second image data may both be received from one camera, such as where a first A/V recording and communication doorbell 130 captures multiple image data of a person.

At block B602 the process analyzes the first image data and the second image data. In some of the present embodiments, the analysis at block B602 may include analyzing the first image data and the second image data to determine the presence of a person. This analysis may include scanning for recognizable features of a person(s) in the image data using the computer vision module 163, image recognition software, and/or other methods as described above, for example.

At block B604, based on the analysis from block B602, the process determines that the first image data includes a first partial facial image of a person and the second image data includes a second partial facial image of the person. In some of the present embodiments, the first partial facial image includes a first portion of the face of the person and the second partial facial image does not include the first portion of the face of the person. In other embodiments, the first partial facial image and the second partial facial image may be different, but each include at least part of the same portion of the face of the person. For example, the first partial facial image may be of a right-side profile of the face of the person and the second partial facial image may be of a front of the face of the person, such that a portion of the right side of the face is included in each of the first and second partial facial images.

In one embodiment, for example, the analysis of the first image data and the second image data yields the determination that a person is present in each of the first image and the second image. For example, from the first image data, it may be determined that a first partial facial image of a right side of the face of a person is present and, from the second image data, it may be determined that a second partial facial image of a left side of a face of a person is present. Biometric data, distinguishing facial features, and/or other known techniques may be used to analyze the first and second partial facial images to make the determination that the first partial facial image and the second partial facial image are of the same person.

At block B606 the process generates a composite facial image of the person based, at least in part, on the first partial facial image and the second partial facial image. The composite facial image of the person is generated from the first partial facial image and the second partial facial image using, for example, facial recognition software, 3D modeling software, image processing software, or other processes currently existing or later invented, including those described above.

At block B608 the process generates and transmits, to a client device, a user alert including the composite facial image. The user alert and the composite facial image may be transmitted over the user's network 110 and/or the network 112. The client device, such as the user's client device 114, may be associated with one of the A/V recording and communication doorbells 130, for example, or may be part of a community of networked client devices configured to receive alerts. The composite facial image may then be displayed on a display of the client device. In addition to the composite facial image and the user alert, video, still image, and/or audio information along with the first and/or second image data may also be generated and/or transmitted to the client device.

The process of FIG. 26 may be implemented in a variety of embodiments, including those discussed below. However, the below detailed embodiments are not intended to be limiting, and are provided merely as example embodiments of the present disclosure. Other embodiments similar to those outlined herein may also fall within the scope of the present disclosure.

One embodiment includes two or more A/V recording and communication doorbells 130 (or similar A/V recording and communication devices) associated with one client device and located at one address, such as at one home, business, park, or the like. Each of the two or more A/V recording and communication doorbells 130 may include at least one camera 154. In addition, the two or more A/V recording and communication doorbells may include at least one motion sensor, such as the PIRs 344 of FIG. 21. In some of the present embodiments, the cameras 154 may be activated at all times and may assist with, or be the primary source of, motion detection. In other embodiments, the cameras 154 may be activated in response to motion events registered by the motion sensors. The cameras 154 may record at all times, record only in response to motion events, or record only when activated by the motion sensors in response to motion events. The cameras 154 may be programmed to record for a predetermined amount of time after a motion event occurs. Example predetermined times for continued recording after a motion event occurs are, without limitation, 10 seconds, 20 seconds, 30 seconds, 40 seconds, and one minute. In some of the present embodiments, the predetermined amount of time may also be set by the user of the client device associated with the A/V recording and communication doorbells 130. In either embodiment, the cameras 154 are configured to record motion events including those caused by people and/or objects of interest in the field of view of the cameras 154, and to generate image data representative of the recording.

In an embodiment in which two doorbells 130 (or other types of A/V recording and communication devices) are located at a same property or address, at least a first camera 154 of a first A/V recording and communication doorbell 130 generates first image data in response to a first motion event and a second camera 154 of a second A/V recording and communication doorbell 130 generates second image data in response to a second motion event at the property or address. The first motion event and the second motion event may be related, such as where a person walks past a front door at the property where the first A/V recording and communication doorbell 130 is located and then proceeds to walk past the garage where the second A/V recording and communication doorbell 130 is located. In other embodiments, the first motion event and the second motion event may be unrelated, such as where a person approaches a front door where the first A/V recording and communication doorbell 130 is located and at another day and/or time approaches a back door where the second A/V recording and communication doorbell 130 is located.

Although the present embodiment discusses only first and second image data generated by the cameras 154, this embodiment is not intended to be limiting. In other embodiments, any number of cameras 154 associated with any number of A/V recording and communication doorbells 130 may generate any number of image data in response to any number of motion events. For example, a camera 154 of only one A/V recording and communication doorbell 130 may capture both the first image data and the second image data. In another example, more than two A/V recording and communication doorbells 130 may capture first, second, and third image data to be used in generating the composite facial image.

With reference to FIG. 26, in response to the generation of the image data, the first image data and the second image data are transmitted and received, at block B600. The first image data and the second image data may be received by, for example, one of the two or more A/V recording and communication doorbells 130 in network communication with each other, by a hub device in networked communication with the two or more A/V recording and communication doorbells 130, or by a backend server in networked communication with the two or more A/V recording and communication doorbells 130. In some of the present embodiments, the first image data and the second image data may be received by a client device associated with the two or more A/V recording and communication doorbells 130.

After receiving the image data, the first image data and the second image data (and any additional image data received) is analyzed, at block B602. The analysis may be carried out by facial recognition software (or other biometric analysis software), facial feature and characteristic analysis, and other types of facial recognition described herein and/or later developed. In some of the present embodiments, the first part of the analysis at block B602 may be to determine the presence of one or more people in each of the first image data and the second image data. Once it is determined that one or more people are present, the first image data and the second image data may then be analyzed to retrieve facial images.

In some of the present embodiments, the facial images captured may be sufficient for determining appearance and identity without any further processing. In such embodiments, the facial images may be transmitted to the display of the client device for viewing by the user of the client device.

However, as described above, sometimes only partial facial images are retrieved from image data, and thus further processing may be performed in order to generate a more complete facial image that is more useful for appearance and identity recognition. In situations such as this, the facial images may only be partial facial images that may or may not be sufficient for determining appearance or identity. In such embodiments, the partial facial images may be analyzed, such as by comparing the partial facial images to one another to determine if the partial facial images are of the same person. Based on this analysis, it may be determined that the first partial facial image from the first image data and the second partial facial image from the second image data are of the same person, at block B604. The determination that the partial facial images are of the same person may be done by comparing, for example, distinguishable facial features, by comparing biometric data, and/or by analyzing non-facial features and/or characteristics such as clothing, jewelry, headwear, hair and/or skin color, body movements including cadence, stride, arm sway, and posture, or any other distinguishing non-facial features and characteristics of the person.

With further reference to FIG. 26, once the determination has been made that the partial facial images are of the same person, the partial facial images are used in generating a composite facial image of the person, at block B606. A first step to generating the composite facial image may be to determine which of the partial facial images should be used. In some of the present embodiments, there may only be two partial facial images, so the two available partial facial images would be used in generating the composite facial image. However, another scenario may include more than two partial facial images. For example, the person may be in the field of view of the camera 154 for a second or more. With a frame rate of 15-30 frames per second, for example, 15-30 images are captured each second. As such, there may be a large number of partial facial images to choose from for generating the composite facial image. In such embodiments, a determination may be made which of the partial facial images to use based on, for example, the image quality, the portion of the face in the partial facial image, and other factors indicative of the usability of a given image in generating a composite facial image of the person.

For example, if multiple partial facial images are analyzed of the person, they may initially be sorted by the portions of the face present in each of the partial facial images, such as left side profile, right side profile, front view, rear view, etc. After the multiple partial facial images are sorted by portions of the face, the partial facial images may then be sorted by image quality, with the highest quality facial images for each portion of the face being selected for inclusion in the composite facial image generation. In some embodiments, prior to any sorting, one step may be to remove any partial facial images that are of too poor quality to be used for any facial recognition analysis or composite facial image generation.

Once the multiple partial facial images are sorted and the best quality partial facial images are selected, the partial facial images to be used may be selected. For example, it may be preferable to have a partial facial image of a left side profile and a partial facial image of a right-side profile of the person in order to generate a more accurate and/or complete composite facial image. In such an example, the best quality left side profile and best quality right side profile images may be selected.

Once the selection is made, the composite facial image may be generated. In some of the present embodiments, the composite facial image may be a front view of the face of the person generated based on the partial facial images. In other embodiments, the composite facial image may be a three-dimensional (3D) view of the face and head of the person. In such embodiments, the composite facial image may be programmed to be freely rotatable by the user of the client device such that the user can interact with the composite facial image by rotating the composite facial image for viewing from different angles. This rotatability of the composite facial image may aid the user in identifying the person.

In some embodiments, the composite facial image may be rotatable by 360° about a vertical axis and/or rotatable about more than one axis, while in other embodiments the composite facial image may be rotatable by an angle less than 360°. In some embodiments, the angle less than 360° may be determined by the sufficiency of the partial facial images used to generate the composite facial image. For example, if one or more portions of the head and/or face of the person are not captured in the partial facial images ("undefined" portions), then the composite facial image may not be rotatable by an angle that would make the undefined portions of the head and/or face visible.

With further reference to FIG. 26, after generation of the composite facial image, a user alert may be generated and transmitted to the client device, the user alert including the composite facial image, at block B608. In addition to the user alert including the composite facial image, video footage may also be transmitted to the client device from one or more of the A/V recording and communication doorbells 130. For example, the recorded footage that included the image data including at least one of the partial facial images may be transmitted along with the user alert. In such an example, while the user of the client device is viewing the recorded video footage, they may see a portion of a face of a person in the footage. However, the user may not be able to recognize the person because the facial image is only a portion of the face. As a result of the process described herein, this problem is resolved. Because the user alert includes the composite facial image, the user may now be able to view the recorded footage and also see the composite facial image on a display of their device. This enables the user to not only view the video footage to determine if the behavior of the person is suspicious, but also to view a composite facial image of the person to determine the person's identity and/or to determine if the person is suspicious. In embodiments where the composite facial image and the video footage are displayed concurrently, the composite facial image may be overlaid onto the streaming video footage or displayed adjacent the streaming video footage, such as to the side of the display or in a corner of the display.

In some embodiments, the video footage may also be streamed live to the client device. In such embodiments, processes described herein may take place concurrently with the transmitting of the live video. For example, the motion sensors and/or the first camera of the first A/V recording and communication doorbell may detect a motion event, begin recording live video, and also begin transmitting the live video to the client device associated with the first A/V recording and communication device. As such, at this time, the user is able to view the live video footage on a display of their client device. While the live video is being transmitted to the client device, the analysis of the image data based on the live video may be taking place, at block B602. Based on the analysis, once it is determined that the first partial facial image and the second partial facial image are of the same person at block B604, and the composite facial image is generated at block B606, the composite facial image may be transmitted to the client device, at block B608, to be displayed alongside, overlaid on, or accessed separately from, the live video footage.

This process not only allows the user of the client device to view the motion event as it is taking place, but also to receive more detailed information in the form of a composite facial image in real time while viewing the motion event. Using this process enables the user of the client device to more accurately, effectively, and efficiently identify not only suspicious activity, but also suspicious persons, and to take the appropriate action such as alerting neighbors, law enforcement, family member(s), and the like.

In addition, enabling the user of the client device to view the composite facial image may aid the user in avoiding false positives for suspicious activity and/or persons. For example, the user of the client device may believe that the person is a suspicious person based on the activity and/or the partial facial image in their video footage, but upon receiving the composite facial image, may realize that the person is an authorized person, such as a neighbor, a relative, etc.

The processes described herein may include additional processing after generation of the composite facial image at block B606. For example, facial recognition software may be used to compare facial features of the person in the image(s) based on the composite facial image to a database of known suspicious persons, such as a criminal database and/or a "most wanted" database. This comparison may be performed using any of the facial recognition algorithms described above, or later developed. Upon a determination that the person is in the database of suspicious persons, a warning flag may be set, and/or the user alert transmitted to the client device may also include information about the suspicious person. The facial recognition software may also use biometric information, and/or distinguishing facial features, as described above.

The database of known suspicious persons may be resident on the A/V recording and communication doorbell 130 or on the client device, but more commonly will be located on a server and accessed through an API. The database may contain as much information as possible about each known suspicious person, such as their facial features or characteristics, name, aliases, and/or criminal history. However, the database may also contain as little information as an image of the face of a known suspicious person, even if that person is otherwise unidentified by name or other typical identifying information. In one embodiment, the database of known suspicious persons is a database of convicted felons and/or registered sex offenders. In another embodiment, the database of known suspicious persons may be modified by the user, such as through the client device. Specifically, the user may, upon review of stored composite facial images of visitors, or upon a request to identify the person in the composite facial image as suspicious or authorized, flag a particular stored image of a visitor as suspicious. This composite facial image may then be uploaded into the database. This flagging function can further be notated by the user as a "public" suspicious person, who might be exhibiting suspicious behavior as to an entire neighborhood, such as, for example, a suspicious person that the user saw breaking a neighbor's windows, or it can be notated by the user as a "private" suspicious person, such as, for example a hostile co-worker whose presence may be suspicious with respect to the user's home, but not to the public at large. Additionally, a user may upload one or more images of persons that the user considers suspicious into the database, from sources other than those captured by the A/V recording and communication doorbell 130, e.g., from the user's smartphone camera. This example embodiment allows for the user to receive alerts about persons that are suspicious to the user, for example, an ex-spouse, a hostile co-worker, a hostile neighbor, etc., but who are not otherwise known to be suspicious to society at large.

In some of the present embodiments, the user of the client device may also be able to flag visitors, based on the composite facial image, as authorized users. In such embodiments, the person may be added to a database of authorized persons. As such, for example, if an authorized person visits again, a user alert is not generated and transmitted to the client device because the person has been deemed authorized. However, even though a user alert may not be transmitted to the client device, a record of the visit of the authorized person may still be saved for later access by the user of the client device.

In another embodiment, the process determines if the person that is in the field of view of the camera 154 of the A/V recording and communication doorbell 130 is exhibiting suspicious behavior. This determination can be performed either at the same time as, before, or after the determination is made as to whether the person can be identified as a suspicious person using one or more database searches. Similar to the recognition of suspicious person described above, the recognition of suspicious behaviors may be accomplished using algorithms (calculating loitering time, etc.) and comparisons to databases of suspicious activities (concealing objects, running, crouching, etc.).

Again, this additional processing of comparing the composite facial images to databases of suspicious and/or authorized persons provides another level of security to the user of the client device. For example, the user may believe that the person in the composite facial image is not recognizable, but maybe doesn't believe them to be suspicious, so they disregard the person as someone who had the wrong address, or was going door to door, or another seemingly harmless act. However, by comparing the composite facial image to a database of suspicious persons, the user of the client device may receive another layer of information about the person that may enable them to make a more educated decision as to whether or not to pursue law enforcement help, report the incident to their landlord, share the information with their neighborhood, etc. Ultimately, without receiving the composite facial image, the user of the client device may have never been able to fully ascertain the appearance of the person captured in the image data, and even more, without the comparison of the composite facial image to the database of suspicious persons, the user may never have realized that this person was potentially dangerous or had been flagged by others in the surrounding area as a person of interest or suspicion.

Figure 27:
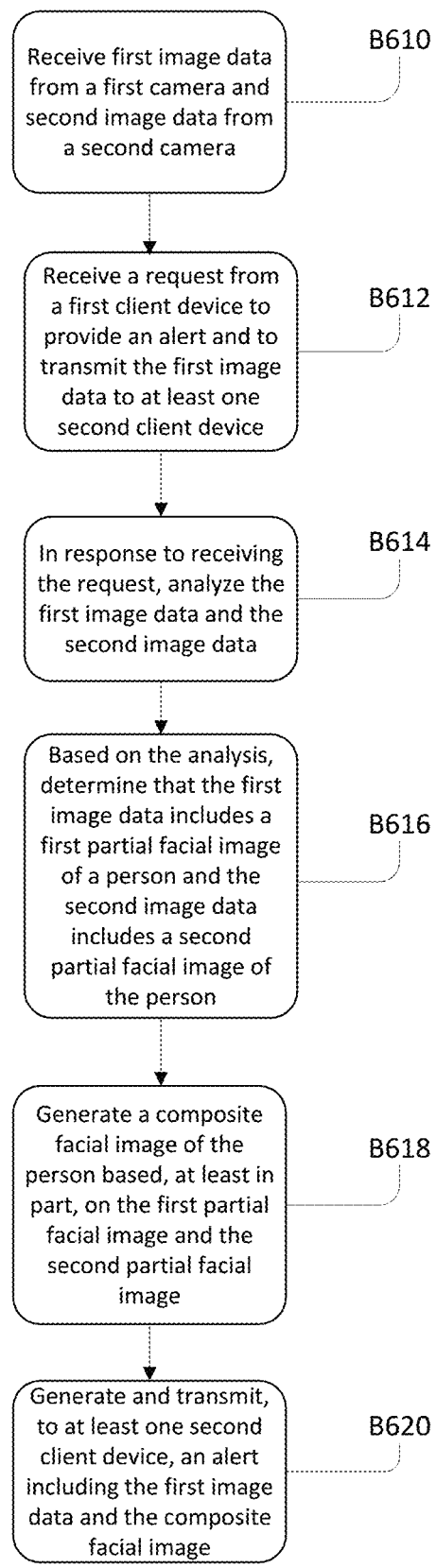

FIG. 27 illustrates another example embodiment of a process for generating composite facial images of a person according to various aspects of the present disclosure. At block B610, the process receives first image data from a first camera and second image data from a second camera. For example, the first image data from a first camera 154 of a first A/V recording and communication doorbell 130 and the second image data from a second camera 154 of a second A/V recording and communication doorbell 130 may be received over the user's network 110 and/or the network 112. Unlike the above described embodiment with respect to FIG. 26, the current embodiment is intended to be implemented where the first and second A/V recording and communication doorbells are at different addresses and/or associated with different users (e.g., different client devices).

At block B612, the process receives a request from a first client device to provide an alert and to transmit the first image data to at least one second client device. For example, assuming that the first A/V recording and communication doorbell 130 is associated with the first client device and the second A/V recording and communication doorbell 130 is associated with a second client device, a request is received, over the user's network 110 and/or the network 112, from the first client device to provide an alert to at least the second client device, and/or to transmit the first image data to at least the second client device.

At block B614, in response to receiving the request, the process analyzes the first image data and the second image data. For example, the first image data from the first camera 154 of the first A/V recording and communication doorbell 130 associated with the first client device and the second image data from the second camera 154 of the second A/V recording and communication doorbell 130 associated with the second client device are analyzed, similar to the process described above with respect to FIG. 26 at block B602.

At block B616, based on the analysis, the process determines that the first image data includes a first partial facial image and the second image data includes a second partial facial image of the person, similar to block B604 of FIG. 26. At block B618, the process generates a composite facial image of the person, based at least in part, on the first partial facial image and the second partial facial image. Again, this process may be similar to that outlined above with respect to block B606 of FIG. 26. At block B620, the process generates and transmits to at least one second client device, an alert including the first image data and the composite facial image. For example, an alert is generated and transmitted to the second client device over the user's network 110 and/or the network 112, where the alert includes the composite facial image and the first image data, where the first image data may have been used in the generating the composite facial image.

The process of FIG. 27 may be implemented in a variety of embodiments, including those discussed below. However, the below detailed embodiments are not intended to be limiting, and are provided merely as example embodiments of the present disclosure. Other embodiments similar to those outlined herein may also fall within the scope of the present disclosure.

In one embodiment of the process of FIG. 27, a first A/V recording and communication doorbell 130 having a first camera 154 and associated with a first client device, and a second A/V recording and communication doorbell 130 having a second camera 154 and associated with a second client device, are implemented. In addition, the first and second A/V recording and communication doorbells may be located at different addresses and/or properties.

In this embodiment, a first motion event may be captured by the first camera 154 and first image data may be generated by the first camera 154 of the first A/V recording and communication doorbell 130, and a second motion event may be captured by the second camera 154 and second image data may be generated by the second camera 154 of the second A/V recording and communication doorbell 130.

As an example, the first A/V recording and communication doorbell 130 may be located at the front door of a first address, and the first motion event may be captured in response to a person approaching the front door. The second A/V recording and communication doorbell 130 may be located at the front door of a second address, and the second motion event may be captured in response to a person approaching the front door. In response to the motion events, and the generation of the first image data and the second image data, the first image data and the second image data are received at block B610.

The user of the first client device may review the video and/or still image(s) recorded by the first A/V recording and communication doorbell in response to the first motion event and determine that a person is present, but the appearance of the person is not discernible because only a portion of the person's face is visible. As a result, the user of the first client device may request to share the first image data and to provide an alert to at least the second client device at block B612. For example, the user of the first client device may wish to share the first image data with the second client device, where the second client device is associated with the second A/V recording and communication doorbell which is located in the same neighborhood as the first A/V recording and communication doorbell (e.g., at a neighbor's house, down the street, or within a predetermined radius of the first A/V recording and communication doorbell 130). This sharing may be done in hopes of gaining a composite facial image of the person who triggered the first motion event, or may be done without knowledge that gaining a composite facial image is possible. At block B612, the request is received from the first client device to provide an alert and to transmit the first image data to at least the second client device.

In some of the present embodiments, the user of the first client device may make the determination of which client device(s) will receive the user alert(s) and the first image data. The client devices may each be associated with at least one other A/V recording and communication doorbell 130. For example, the user may share with a specific client device or with all client devices within a specific radius, neighborhood, city, or the like. In some of the present embodiments, the user may be able to make a selection by drawing (e.g., circle, free-hand, etc.) a zone on a map, for example, on the display of the first client device. As such, the user alert and first image data may be shared with all client devices associated with each of the A/V recording and communication doorbells 130 in the zone. In other embodiments, the user may be able set a radius in which to share the user alerts and the first motion data. For example, the user may be able to manipulate a tool on the display of the first client device (e.g., a slider, a scale, etc.) for enlarging or shrinking the radius of a circle surrounding the address of the A/V recording and communication doorbell 130 associated with the first client device.

In other embodiments, the determination of which client devices will receive the user alert(s) and the first image data may be made without user input. For example, this determination may be made based on location and/or time. For example, it may be determined that the user alert and the first image data should be shared with devices within a predetermined radius of the first A/V recording and communication doorbell 130. Example, and non-limiting, values for the predetermined radius may be a quarter of a mile, half a mile, a mile, two miles, or ten miles. In some of the present embodiments, neighborhood, town, city, or other boundaries may be preset such that the user alert and the first image data are shared with the neighborhood, town, city, etc. in which the A/V recording and communication doorbell 130 associated with the client device of the user is located.

In any embodiment, once the request to provide the user alert and transmit the first image data is received, the user alert and the first image data may be transmitted to each of the client devices associated with the A/V recording and communication doorbells 130 in the specified regions (e.g., neighborhood, drawn area, radius, etc.).

As mentioned above, a temporal element may also be considered when determining which of the client devices will receive the user alert and the first image data. For example, if within the specified region there are forty A/V recording and communication doorbells, the alert and the first image data may only be transmitted to the A/V recording and communication doorbells 130 that registered a motion event within a specified time of the first motion event captured by the first A/V recording and communication doorbell 130. Example, and non-limiting, times for the specified times are 10 seconds, 30 seconds, 2 minutes, or 10 minutes. In some of the present embodiments, the specified time may be set by the user of the first client device.

Following the process of FIG. 27, at block B612, the process receives a request from the first client device to provide an alert and to transmit the first image data to at least one second client device. In this embodiment, the at least one second client device may be the second client device described above, determined in response to the settings described above (e.g., location of A/V recording and communication doorbells, time of motion events, user settings, etc.). In this embodiment, the camera 154 of the second A/V recording and communication device 130 associated with the second client device has generated second image data in response to a second motion event.

At block B614, in response to receiving the request, the process analyzes the first image data and the second image data. As such, using the received first image data and second image data received at block B610, and in response to receiving the request to transmit the first image data to the second client device at block B612, the process analyzes the first image data and the second image data.

Based on the analysis, at block B616, the process determines that the first image data includes a first partial facial image of a person and the second image data includes a second partial facial image of the person. This determination, similar to that described above with respect to block B604 of FIG. 26, may be done using facial recognition, behavior recognition, and/or object recognition software, for example. The determination may be that a first portion of the face of the person is present in the first image data and a second portion of the face of the person different than the first portion is present in the second image data.

For example, the person may have walked past the first front door in front of the first A/V recording and communication doorbell 130 such that a left side of their face was captured by the first camera 154. The person may have also walked a different direction past the second front door in front of the second A/V recording and communication doorbell 130 such that a right side of their face was captured by the second camera 154. At block B616, the determination is made based on the two partial facial images that the person in the first image data and the second image data is the same person.

At block B618, the process generates a composite facial image, based at least in part on the first partial facial image and the second partial facial image. Block B618 may be completed similar to that described above with respect to block B606 of FIG. 26. The process may, for example, generate a front view, a 3D view, and/or an alternative view that provides easier appearance recognition than the partial facial images captured in the first and second image data.

At block B620, the process generates and transmits to at least one second client device an alert including the first image data and the composite facial image. As such, the process receives the alert including the first image data and the composite facial image and transmits at least the composite facial image to the second client device associated with the second A/V recording and communication doorbell 130. This way, when viewing the video footage of the second motion event, the user of the second client device can not only see the activity of the person of in the video, but also more clearly see who the person is from the composite facial image. This functionality provides an additional layer of security for the user of the second client device. In addition, the composite facial image may also be transmitted to the first client device so that the user of the first client device can now more clearly determine the appearance and/or identity of the person in the video captured by the first camera 154.

In the present embodiments, by sharing image data, members of common communities, neighborhoods, and other location-bound regions can help one another to more accurately and effectively identify persons. For example, without the process of FIG. 27, the owners of the first and second A/V recording and communication doorbells 130 may never determine the appearance of the person on their doorsteps. By sharing the image data to generate a composite facial image, identification of the person is more likely to occur. In addition, similar to that described above with respect to FIG. 26, the composite facial image may be compared and/or added to databases of suspicious and/or authorized persons in order to learn even more about the person who visited both the first and second addresses. In this way, the owners of the first and second A/V recording and communication doorbells are able to make more informed decisions as to alerting police, sharing information with neighbors, etc., which ultimately leads to safer neighborhoods and communities.

Figure 28:
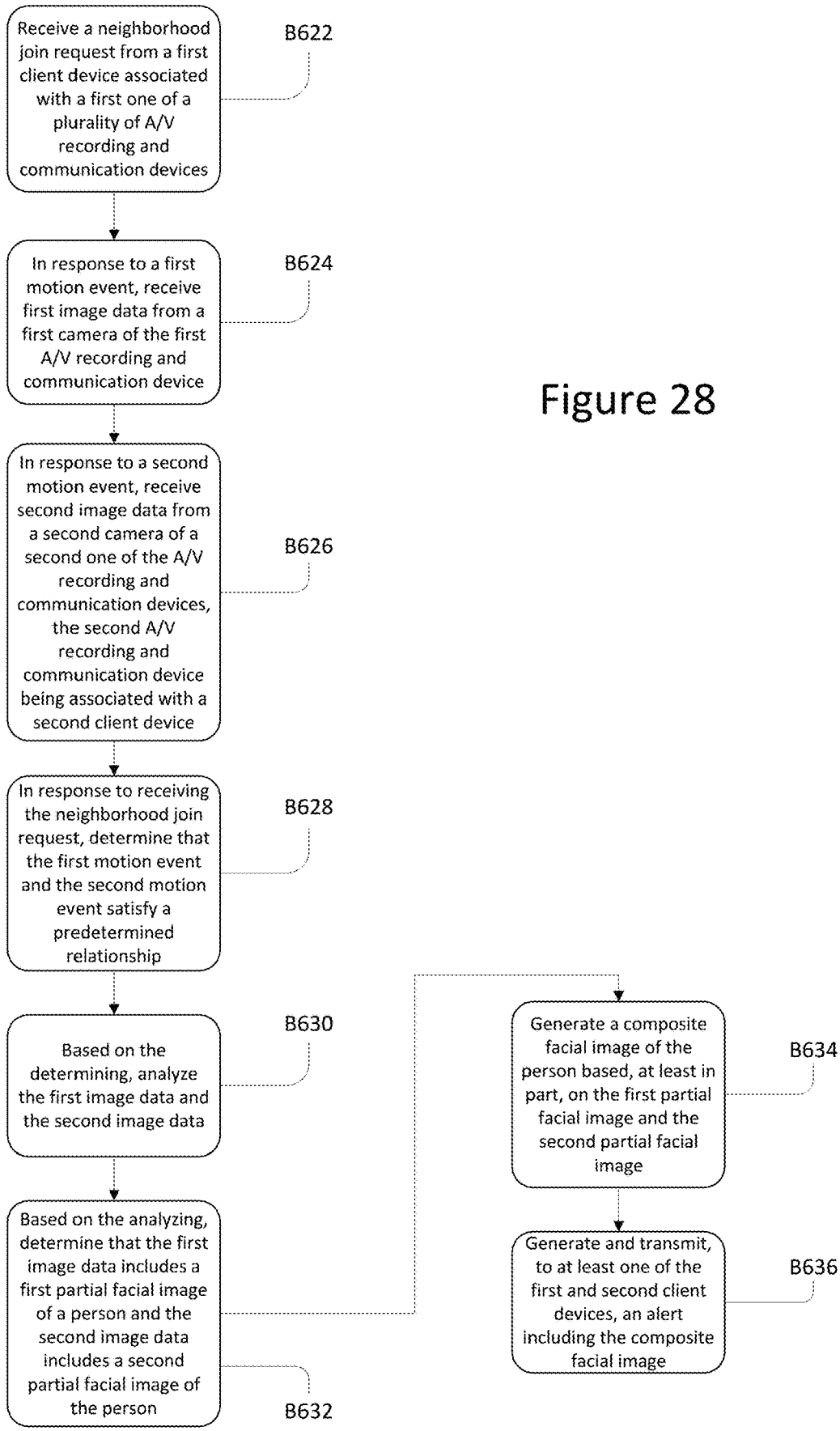

FIG. 28 is a flowchart illustrating another example embodiment of a process for generating composite facial images of a person according to various aspects of the present disclosure. The process, at block B622, receives a neighborhood join request from a first client device associated with a first one of a plurality of A/V recording and communication devices. The neighborhood join request may be received over the user's network 110 and/or the network 112. For example, the user of the first client device may wish to share their image data and user alerts with other client devices, especially other client devices associated with other A/V recording and communication doorbells 130 in the same neighborhood (or another geographic region).

In response to a first motion event, the process, at block B624, receives first image data from a first camera of the first A/V recording and communication device. For example, in response to a person entering the field of view of the first camera 154 of the first A/V recording and communication doorbell 130, the first image data generated by the camera 154 is received over the user's network 110 and/or the network 112.

In response to a second motion event, the process, at block B626, receives second image data from a second camera of a second one of the A/V recording and communication devices, the second A/V recording and communication device associated with a second client device. For example, in response to a person entering the field of view of the camera 154 of the second A/V recording and communication doorbell 130, the second image data generated by the second camera 154 is received over the user's network 110 and/or the network 112.

In response to receiving the neighborhood join request, the process, at block B628, determines that the first motion event and the second motion event satisfy a predetermined relationship. For example, the predetermined relationship may be a location-based and/or time-based relationship. As such, the process compares the first motion event and the second motion event to the predetermined relationship. The information about the first motion event and the second motion event may be stored in the image data. The information may be stored in the image data as metadata, for example, such as in the form of location metadata from a global positional system (GPS) or Wi-Fi positioning system (WPS) and/or time metadata from a clock of the A/V recording and communication doorbell 130. As such, the information from both the first motion event and second motion event are compared to one another in view of the predetermined relationship.

If the predetermined relationship is location based, the location may be determined similarly as described above with respect to FIG. 27. For example, the location-based predetermined relationship may be a proximity relationship between the first A/V recording and communication doorbell 130 that captured the first motion event and the second A/V recording and communication doorbell 130 that captured the second motion event. In such an example, example, and non-limiting, proximity values may be a circle with a radius of a quarter of a mile, half a mile, a mile, or five miles. The proximity values may also be based on a rectangle, or other shape. In some of the present embodiments, the proximity may not be a circle having a radius or other defined shape, but rather a predetermined zone, such as a neighborhood, a town, a city, or the like. In such an embodiment, if the first motion event and the second motion event are within the predetermined zone, the user alert and the first image data may be transmitted to the client devices associated with the A/V recording and communication doorbells 130 that captured the motion events.

In addition to the location-based predetermined relationships, time-based relationships may also be implemented. In some of the present embodiments, the time-based predetermined relationships may be a time gap between the first and second motion events. Example, and non-limiting, time gaps may be one minute, two minutes, five minutes, or ten minutes. As such, the time of the first and second motion events may be compared to determine if they occurred within the predetermined time gap. In such an embodiment, if the first motion event and the second motion event occur within the predetermined time gap, the user alert and the first image data may be transmitted to the client devices associated with the A/V recording and communication doorbells 130 that captured the motion events.

In some of the present embodiments, the time-based predetermined relationships may add an additional layer to the predetermined relationship on top of the location-based predetermined relationships. For example, in some of the present embodiments, a time-based and location-based predetermined relationship may be implemented. In such an embodiment, for example, the first motion event and the second motion event must occur within a predetermined proximity and within a predetermined time gap of one another. In such an embodiment, if both the time- and location-based predetermined relationships are satisfied, the user alert and the first image data may be transmitted to the client devices associated with the A/V recording and communication doorbells 130 that captured the motion events.

With reference to FIG. 28, based on the determining, the process, at block B630, analyzes the first image data and the second image data. For example, the first image data from the first A/V recording and communication doorbell 130 and the second image data from the second A/V recording and communication doorbell 130 are analyzed. This analysis may be similar to that of block B602 of FIG. 26 and block B614 of FIG. 27, described above.

Based on the analyzing, the process, at block B632, determines that the first image data includes a first partial facial image of a person and the second image data includes a second partial facial image of the person. This determination may be similar to that described above at block B604 of FIG. 26 and at block B616 of FIG. 27.

The process continues at block B634 with generating a composite facial image of the person based, at least in part, on the first partial facial image and the second partial facial image. Again, this process may be similar to that of block B606 of FIG. 26 and at block B618 of FIG. 27, described above.

At block B620, the process generates and transmits, to at least one second client device, an alert including the first image data and the composite facial image. For example, a user alert may be generated and transmitted to the second client device associated with the second A/V recording and communication doorbell 130 over the network 112. In some of the present embodiments, in addition to the second A/V recording and communication doorbell 130, the user alert and the composite facial image may be sent to each other client device associated with each other A/V recording and communication doorbell 130 that also transmitted a neighborhood join request and/or captured a motion event that satisfies the predetermined relationship described above.

In other embodiments, client devices not associated with an A/V recording and communication doorbell 130 and/or not satisfying the predetermined relationship may also receive the user alert and the composite facial image. In this way, users of client devices within a certain geographic zone, such as a neighborhood, who may not currently have an A/V recording and communication device, can also receive alerts and composite facial images of persons who may be suspicious. For example, residents of a neighborhood may be able to download an application onto their client devices, and the user alerts and composite facial images may be shared on the application to residents who live within the neighborhood, or within a predetermined proximity of the A/V recording and communication doorbell 130 that captured the motion event including the partial facial image. These embodiments allow for a wider range of information sharing, which ultimately leads to better informed and safer communities.

In some of the present embodiments, the process of FIG. 28 may comprise an "opt-in" type service for a neighborhood, town, city, or other geographic location. For example, within a predetermined geographic region any number of A/V recording and communication doorbells 130 may be implemented, and users of the client devices associated with the A/V recording and communication doorbells 130 may opt-in to a neighborhood monitoring service. The client devices may each opt-in by sending a neighborhood join request. Once the client devices have joined the neighborhood monitoring service, and in response to motion events, the image data may be transmitted by the client devices and then analyzed to determine if the image data includes partial facial images. If it is determined that partial facial images exist in the image data, it may then be determined if the partial facial images are of the same person. If so, a composite facial image may be generated. The composite facial image and/or a user alert may then be transmitted by the server to the client devices signed up for the neighborhood monitoring service within the predetermined geographic zone associated with the neighborhood join request.

In some of the present embodiments, similar to that described above with reference to FIGS. 26 and 27, once the composite facial images are generated, the composite facial images may be compared to a database of suspicious persons. In such embodiments, if it is determined that the person in the composite facial image is a suspicious person, the user alert may include additional information such as the person's name, age, height, sex, etc., and an indication that the person is a suspicious person.

In some of the present embodiments, once it is determined that the person is a suspicious person, an alert may be automatically sent to law enforcement. For example, the partial facial images may be captured at several houses within a neighborhood in response to motion events at each of the houses. The partial facial images may then be analyzed to determine the person in the partial facial images is the same person, and in response, a composite facial image may be generated. The composite facial image may then be compared against databases of suspicious persons, including, for example, a database of prior criminals. In response to comparing the composite facial image to the database of prior criminals, it may be determined that the person is a prior criminal. In response, the composite facial image and an alert may be transmitted to a law enforcement agency, who can then make their own determination of whether action is required, such as dispatching police to the neighborhood, for example.

Using the process of FIG. 28 described above, suspicious activity may be determined automatically or in the background without requiring each user to manually share image data in response to motion events. Because the users have opted in to this neighborhood monitoring service, image data generated in response to motion events may also be automatically analyzed. The process can then generate composite facial images in response to analyzing image data having partial facial images and compare the composite facial images to databases of suspicious persons. In response to the comparison, the process can send alerts to other client devices and/or law enforcement. This process is especially valuable as criminals become more familiar with A/V recording and communication devices and attempt to hide their faces, and especially to hide their entire face, from being recorded. By creating the composite image of the person based on partial facial images, these criminals who are more aware of these devices can still be identified, and people in the neighborhood as well as law enforcement can be notified of the criminal's presence, where with current technology, these criminals may go unidentified. Ultimately, as described above, this process leads to safer, more connected neighborhoods, and also leads to more informed homeowners and law enforcement agencies.

In each of the processes of FIGS. 26-28, the image data including the partial facial images may be further analyzed to determine identifiable features of the person's clothing. For example, logos, artwork, designs, etc. may be analyzed to generate more identifying information about the person. If the person is suspicious, an image of and/or information about the logos, artwork, designs, etc. may be transmitted along with the user alert and the composite facial image to the client devices.

The logos, artwork, designs, etc. may also be used to help determine authorized persons. For example, a mailman (letter carrier) may have been the cause of several motion events where image data was generated by the cameras 154 that included partial facial images of the mailman. The mailman may have the logo of the postal service on his or her uniform, for example, and the image data may be analyzed to determine the presence of this logo. In response, the processes may determine that the mailman is an authorized person or is likely to be an authorized person. In response, in some of the present embodiments, in addition to the user alert and the composite facial image, the process may also transmit the postal service logo and/or information about the logo, such as "This person may be the mailman based on the postal service logo on his or her uniform," for example. The users of the client devices that receive this information may then be able to determine and share the determination that the person is the mailman, an authorized person, and/or a suspicious person. In response, the user feedback may be received, and the mailman may be added to a corresponding database, such as a database of suspicious persons or a database of authorized persons.

In some implementations, a query may be transmitted to the client devices that are associated with the A/V recording and communication doorbells 130 that generated the image data including the partial facial images of the mailman. The query may include a question as to whether the mailman is the mailman, an authorized user, and/or a suspicious person. For example, along with the composite facial image, the user alert, and/or the information about the mailman, the users of the client devices may receive a question, or series of questions, such as, "Is this person the mailman? If so, add this person to the database of authorized persons? If not, add this person to the database of suspicious persons?" In response, the process receives the query feedback from the client devices and responds accordingly by, for example, adding the mailman to the database of authorized persons.

This process again allows for the users of the client devices to make more informed decisions by not only being able to view composite images of the persons in their video footage, but also to view the composite image in addition to identifying information about the person's clothing. Without having the composite image and the identifying information, such as the postal service logo, the user of the client device may believe the person in the video footage is a suspicious person when in fact it is the mailman.

As described with reference to various embodiments herein, a user alert may be generated. In some embodiments, the alert may comprise an alert signal sent to a client device. For example, the alert may include audio and/or video data being transmitted (streamed) from the A/V recording and communication doorbell 130 to the user's client device 114 via the user's network 110 and/or the network 112. The streaming video may include the composite image of the person in the video. The user can then determine whether to take further action, such as alerting law enforcement and/or sharing the video footage with other people, such as via social media.

In some embodiments, the alert may comprise an audible alarm emitted from the speaker 152 of the A/V recording and communication doorbell 130. The audible alarm may be any loud noise likely to attract attention and/or startle a suspicious person, making it more likely that he or she will flee without engaging in further suspicious or criminal behavior.

In some embodiments, the alert may comprise an announcement emitted from the speaker 152 of the A/V recording and communication doorbell 130. The announcement may comprise a verbal warning that the area about the A/V recording and communication doorbell 130 is being recorded. In some of the present embodiments, the alert may comprise both an audible alarm and an announcement in combination. Also, in some of the present embodiments, the alert may comprise any combination of an alert signal sent to a client device, an audible alarm emitted from the speaker 152 of the A/V recording and communication doorbell 130, and an announcement emitted from the speaker 152 of the A/V recording and communication doorbell 130.

In any of the present embodiments, various aspects of methods may be performed locally, e.g. by one or more components of the A/V recording and communication doorbell 130, and/or remotely, e.g. by one or more network devices, such as the server 118 and/or the backend API 120, for example. For example, the processor 160 of the A/V recording and communication doorbell 130 may perform various aspects such as, but not limited to, analyzing the first partial facial image and the second partial facial image to determine that the person in the first partial facial image and the person in the second partial facial image is the same person.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

Figure 29:
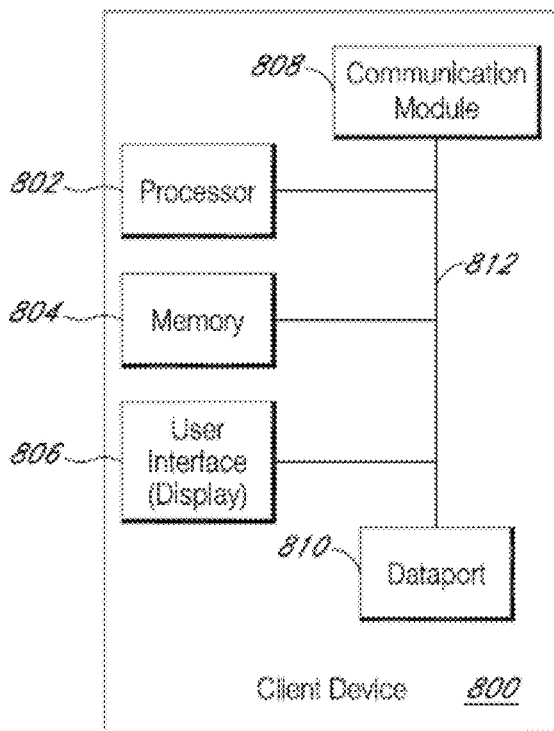
FIG. 29 is a functional block diagram of a client device on which the present embodiments may be implemented according to various aspects of the present disclosure.

FIG. 29 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 29, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some of the present embodiments, the processor 802 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some of the present embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 30:
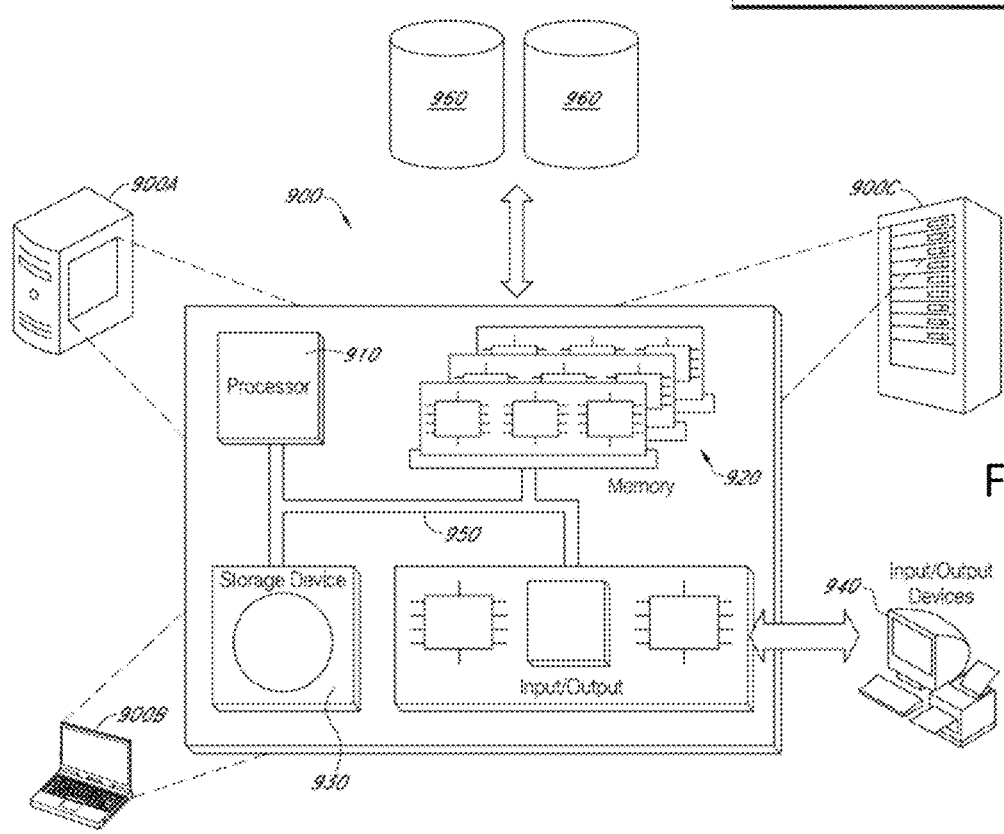
FIG. 30 is a functional block diagram of a general-purpose computing system on which the present embodiments may be implemented according to various aspects of present disclosure.

FIG. 30 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LA/V (local area network), a WA/V (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
receiving, from a first audio/video (A/V) recording and communication device at a first location, first image data representative of a first field of view of a first camera of the first A/V recording and communication device;
receiving, from a second A/V recording and communication device at a second location, second image data representative of a second field of view of a second camera of the second A/V recording and communication device;
analyzing the first image data;
based at least in part on the analyzing the first image data, determining that the first image data depicts a first person within the first field of view;
analyzing the second image data;
based at least in part on the analyzing the second image data, determining that the second image data depicts a second person within the second field of view;
determining that the first person and the second person are a same person;
based at least in part on the first image data, generating a first facial image of the same person;
based at least in part on the second image data, generating a second facial image of the same person;
based at least in part on the first facial image and the second facial image, generating a composite facial image, wherein the composite facial image is a three-dimensional representation of at least a portion of the first facial image and at least a portion of the second facial image;
generating a user alert including the composite facial image representative of the first facial image and the second facial image; and
transmitting, to a client device, the user alert.

2. The method of claim 1, wherein:
the first A/V recording and communication device and the second A/V recording and communication device are associated with the client device; and
the first location and the second location are at a same physical address.

3. The method of claim 1, wherein:
the first A/V recording and communication device is associated with the client device;
the second A/V recording and communication device is associated with another client device;
the first location is at a first physical address; and
the second location is at a second physical address different from the first physical address.

4. The method of claim 1, further comprising:
comparing at least one of the first facial image or the second facial image to a database;
based at least in part on the comparing, determining that the same person is a person of interest; and
retrieving information about the same person from the database,
wherein the user alert further includes data representative of the information.

5. The method of claim 1, further comprising:
transmitting, to the client device, first data representative of a request, the request for determining that the same person is one of authorized or unauthorized;

based at least in part on the request, receiving, from the client device, second data representative of a response to the request;

analyzing the second data;

based at least in part on the analyzing the second data:
when the response is indicative of the same person being authorized, adding the same person to a first database; and
when the response is indicative of the same person being unauthorized, adding the same person to at least one of the first database or a second database.

6. The method of claim 1, wherein the determining that the first person and the second person are the same person comprises:
identifying first features of the first person from the first image data;
identifying second features of the second person from the second image data;
comparing the first features to the second features; and
determining, based at least in part on the comparing, that the first person and the second person are the same person.

7. The method of claim 6, wherein the features include at least one of facial features, clothing features, or movement features.

8. The method of claim 1, wherein the client device comprises at least one of a first client device or a second client device, the method further comprising:
receiving, from the first client device associated with the first A/V recording and communication device, a first join request for a network, the first A/V recording and communication device being associated with a first user; and
receiving, from the second client device associated with the second A/V recording and communication device, a second join request for the network, the second A/V recording and communication device being associated with a second user.

9. The method of claim 8, wherein the transmitting the user alert includes transmitting the user alert to the first client device, the method further comprising:
transmitting, to the first client device, first data representative of a query, the query for determining whether the person is a person of interest;
receiving, from the first client device, second data representative of a response to the query, the response indicative that the person is a person of interest;
based at least in part on the second data representative of the response to the query, generating an additional alert including third data representative of the person and at least one of the first image, the second image, the first image data, or the second image data; and
transmitting the additional alert to a plurality of other client devices associated with a geographical area of the first A/V recording and communication device or the second A/V recording and communication device.

10. The method of claim 1, wherein the determining that the first person and the second person are the same person further comprises determining:
a proximity relationship between the first location of the first A/V recording and communication device and the second location of the second A/V recording and communication device; or
a temporal relationship between:
a first time at which the first person was determined to be within the first field of view of the first A/V recording and communication device, and
a second time at which the second person was determined to be within the second field of view of the second A/V recording and communication device.

11. A method comprising:
receiving, from a first audio/video (A/V) recording and communication device, first image data representative of a first motion event;
receiving, from a second A/V recording and communication device, second image data representative of a second motion event;
determining that the first motion event and the second motion event satisfy a relationship, wherein the relationship includes a proximity relationship between a first location of the first A/V recording and communication device and a second location of the second A/V recording and communication device;
generating a first image of a first person from the first image data;
generating a second image of a second person from the second image data;
based at least in part on the first motion event and the second motion event satisfying the relationship, generating a user alert including data representative of the first image and the second image; and
transmitting, to a client device, the user alert.

12. The method of claim 11, wherein:
the first A/V recording and communication device and the second A/V recording and communication device are associated with the client device; and
the first A/V recording and communication device and the second A/V recording and communication are located at a same physical address.

13. The method of claim 11, wherein:
the first A/V recording and communication device is associated with the client device;
the second A/V recording and communication device is associated with another client device;
the first A/V recording and communication device is installed at a first physical address; and
the second A/V recording and communication device is installed at a second physical address different from the first physical address.

14. The method of claim 11, further comprising:
determining that the first person and the second person are a same person,
wherein the generating the user alert is based at least in part on the first person and the second person being the same person.

15. The method of claim 11, wherein the relationship includes:
a temporal relationship between a first time of the first motion event and a second time of the second motion event.

16. The method of claim 11, further comprising:
comparing at least one of the first image or the second image to a database;
based at least in part on the comparing, determining that at least one of the first person or the second person is a person of interest; and
retrieving information about the person of interest from the database,
wherein the user alert further includes additional data representative of the information.

17. The method of claim 11, wherein the data is first data, and the method further comprising:
transmitting, to the client device, second data representative of a query, the query for determining whether at least one of the first person or the second person is one of authorized or unauthorized;

receiving, from the client device, third data representative of a response to the query;

analyzing the third data;

based at least in part on the analyzing the third data:

when the response is indicative of at least one of the first person or the second person being authorized, adding the at least one of the first person or the second person to a first database; and when the response is indicative of at least one of the first person or the second person being unauthorized, adding the at least one of the first person or the second person to at least one of the first database or a second database.

18. The method of claim 17, further comprising:

comparing the composite facial image to a database of persons of interest;

based on the comparing, determining that the person is a person of interest;

based on the determining that the person is a person of interest, retrieving information about the person from the database; and transmitting the retrieved information with the user alert including the composite facial image.

19. The method of claim 11, further comprising:

based at least in part on the first image and the second image, generating a composite facial image, wherein the data representative of the first image and the second image comprises data representative of the composite facial image.

20. The method of claim 11, wherein the first image data representative of the first motion event comprises at least one image captured by a camera of the first A/V recording and communication device upon detecting motion within a field of view of the camera.

* * * * *